United States Patent

Oba et al.

[11] Patent Number: 6,072,599
[45] Date of Patent: *Jun. 6, 2000

[54] FACSIMILE APPARATUS

[75] Inventors: Ryozo Oba, Susono; Takeo Nishijima; Yasuichi Kishino, both of Mishima, all of Japan

[73] Assignee: Toshiba Tec Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/814,880

[22] Filed: Mar. 13, 1997

[30] Foreign Application Priority Data

Mar. 14, 1996 [JP] Japan .................................. 8-057317
Mar. 14, 1996 [JP] Japan .................................. 8-057318
Mar. 14, 1996 [JP] Japan .................................. 8-057319

[51] Int. Cl.$^7$ ........................................... H04N 1/40
[52] U.S. Cl. ........................... 358/444; 358/400; 358/404; 358/442; 358/468
[58] Field of Search .................................. 358/468, 442, 358/411, 404, 400, 500, 407, 444

[56] References Cited

U.S. PATENT DOCUMENTS

| | | | |
|---|---|---|---|
| 4,964,154 | 10/1990 | Shimotono | 379/100 |
| 5,255,106 | 10/1993 | Castro | 358/400 |
| 5,280,366 | 1/1994 | Araki | 358/453 |
| 5,307,178 | 4/1994 | Yoneda | 358/440 |
| 5,396,341 | 3/1995 | Takahashi et al. . | |
| 5,552,901 | 9/1996 | Kikuchi et al. | 358/468 |
| 5,579,126 | 11/1996 | Otsuka . | |
| 5,684,607 | 11/1997 | Matsumoto . | |
| 5,684,864 | 11/1997 | Shibata | 379/96 |

FOREIGN PATENT DOCUMENTS 0 762 725   3/1997   European Pat. Off. .

OTHER PUBLICATIONS

Patent Abstracts of Japan, vol. 095, No. 003, Apr. 28, 1995, of JP 06 350786 A, Dec. 22, 1994.
Patent Abstracts of Japan, vol. 017, No. 287 (E–1374), Jun. 2, 1993, of JP 05 014580 A, Jan. 22, 1993.

*Primary Examiner*—Leo H. Boudreau
*Assistant Examiner*—Kanji Patel
*Attorney, Agent, or Firm*—Frishauf, Holtz, Goodman, Langer & Chick, P.C.

[57] ABSTRACT

Image data received from an original-document reading portion is stored in an image memory, and then transmitted to another facsimile apparatus. At this time, whenever image data for one communication is transmitted, information indicating a result of the transmission is stored. Also, image data received from a personal computer is stored in an image memory, and is then transmitted to the other facsimile apparatus. At this time, whenever image data for one communication is transmitted, information indicating a result of the transmission is stored. A communication management report is then output which enables identification to easily be performed with respect to whether image data supplied from the original-document reading portion has been transmitted or image data supplied from the personal computer has been transmitted.

4 Claims, 17 Drawing Sheets

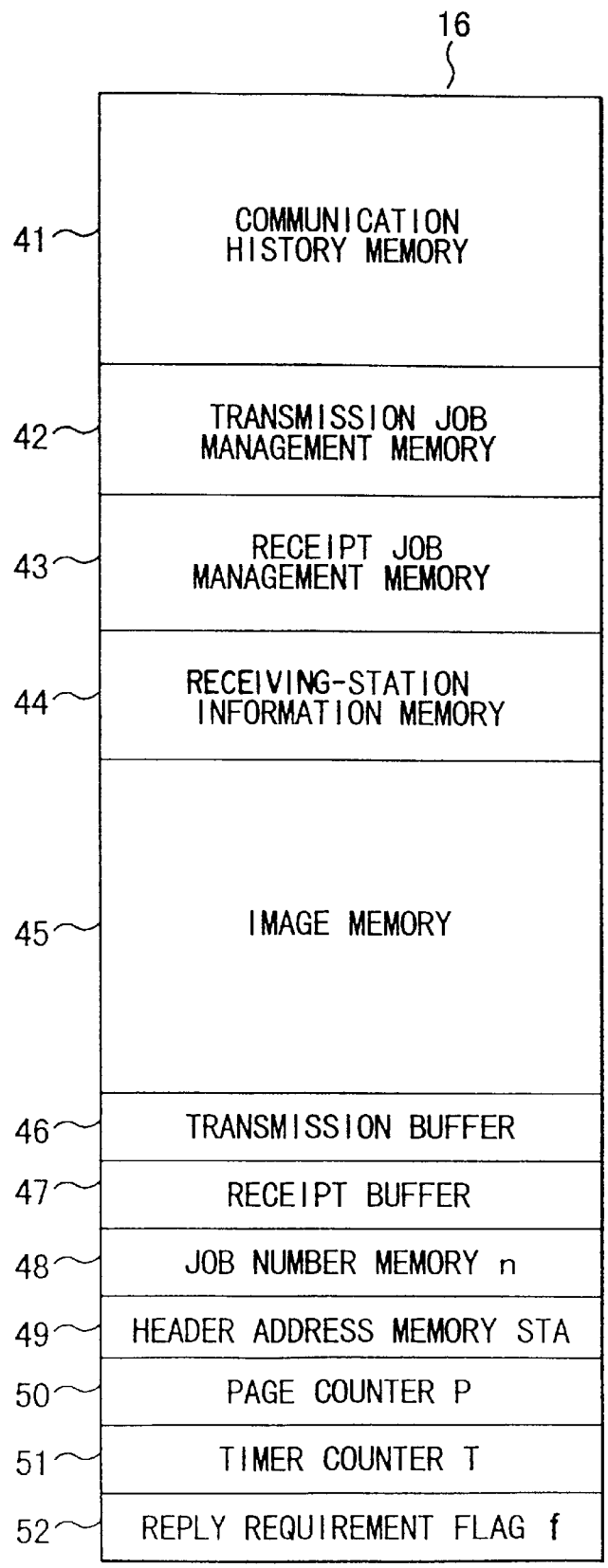
F I G. 4

| IDENTI-FIER | DATE | TIME | ID OF STATION | PAGE A | PAGE B | TIME | STATUS A | STATUS B | STATUS C | JOB NO. |
|---|---|---|---|---|---|---|---|---|---|---|
| 1 | YYMMDD | hhmm | 99...99 | | 10 | 04:03 | NG ERR 01 | OK | | 100 |
| 1 | YYMMDD | hhmm | 99...99 | 1 | 1 | 00:34 | OK | OK | | 101 |
| 2 | YYMMDD | hhmm | 99...99 | 10 | 1 | 00:34 | OK | OK | | 102 |
| 1 | YYMMDD | hhmm | 99...99 | 2 | 10 | 04:11 | OK | OK | | 103 |
| 2 | YYMMDD | hhmm | 99...99 | | 0 | 00:22 | NG ERR 10 | NG ERR 71 | PC | 104 |
| 1 | YYMMDD | hhmm | 99...99 | | 2 | 00:51 | | OK | PC | 105 |
| 1 | YYMMDD | hhmm | 99...99 | 1 | 13 | 05:05 | | OK | PC | 106 |
| 2 | YYMMDD | hhmm | 99...99 | 1 | 1 | 00:33 | OK | NG ERR 55 | PC | 107 |
| 2 | YYMMDD | hhmm | 99...99 | | | | | | PC | 108 |

F I G. 5

| JOB NO. | ID OF STATION | PAGE | STA | STATUS D | OP |
|---|---|---|---|---|---|
| 100 | 99···99 | 10 | m···n | | |
| 103 | 99···99 | 1 | m···n | PC | 1 |
| 105 | 99···99 | 2 | m···n | PC | 0 |
| 106 | 99···99 | 2 | m···n | | |

| JOB NO. | PAGE | STA |
|---|---|---|
| 102 | 1 | m···n |
| 104 | 10 | m···n |
| 107 | 13 | m···n |
| 108 | 1 | m···n |

| JOB NO. | INFORMATION OF RECEIVING STATION |
|---|---|
| 103 | ···· |
| 105 | ···· |

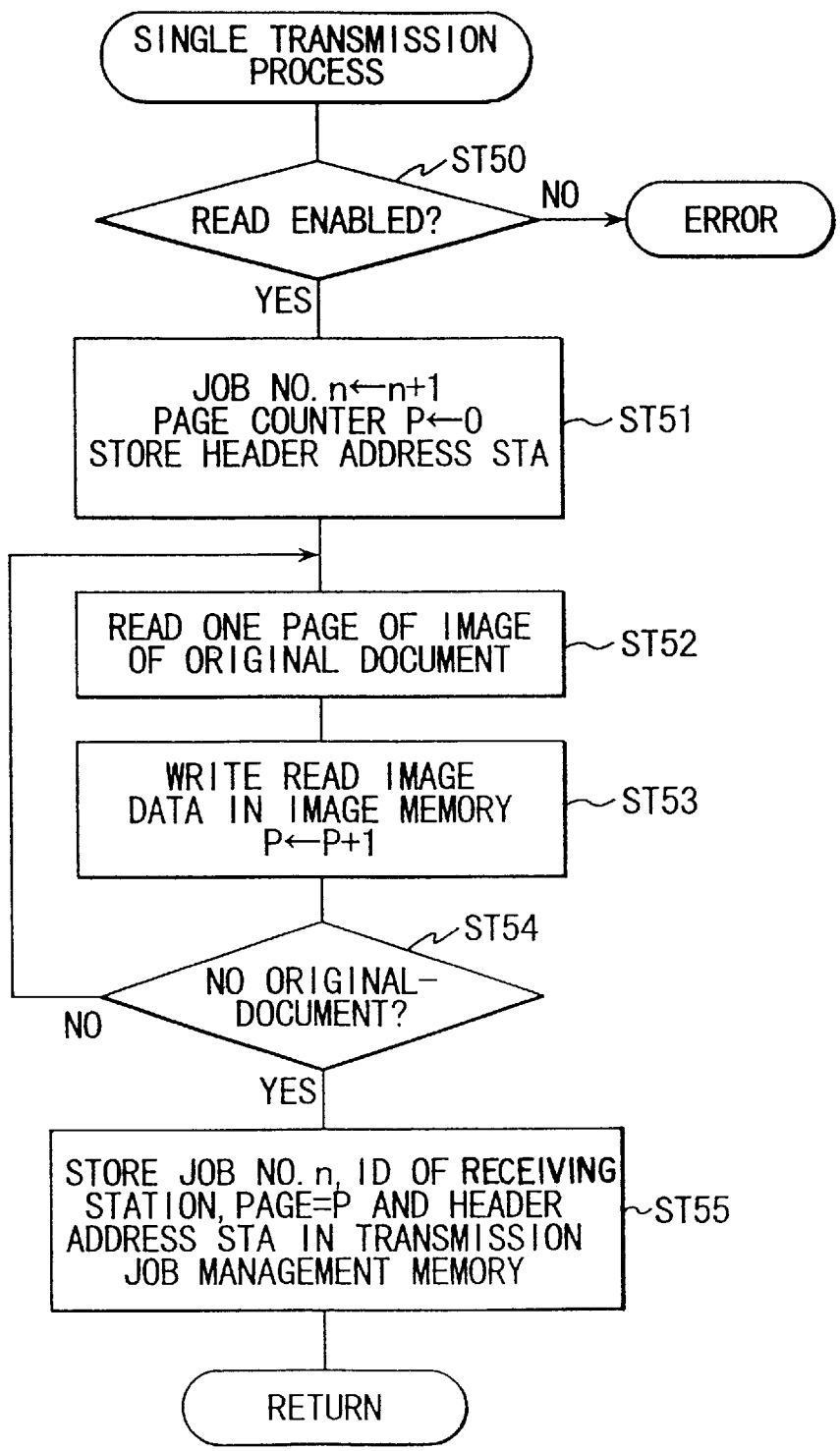
F I G. 13

```
                    RECORD OF TRANSMISSION
DATE OF RECEIPT   09:20  13:22  TRANSMITTED TO 0555-11-9876
NUMBER OF
TRANSMITTED PAGES  PC-FAX  ONE PAGE      FAX-FAX  ONE PAGE
RESULT OF
COMMUNICATION      PC-FAX  OK             FAX-FAX  OK
```

FIG. 16

```
           SCREEN OF RECORD OF TRANSMISSION

DATE OF TRANSMITTED    09:20     13:22
TRANSMITTED TO         0555-11-9876

NUMBER OF TRANSMITTED  PC-FAX   ONE PAGE
       PAGES           FAX-FAX  ONE PAGE

RESULT OF              PC-FAX   OK
COMMUNICATION          FAX-FAX  OK
```

FIG. 17

```
                     RECORD OF RECEIPT
DATE OF RECEIPT   09:20 13:22  TRANSMITTED FROM 0555-11-9876
NUMBER OF
TRANSMITTED PAGES  FAX-FAX  THREE PAGES   PC-FAX  ONE PAGE
RESULT OF
COMMUNICATION      FAX-FAX  OK            PC-FAX  NG
```

FIG. 18

\*\*\* REPORT OF COMMUNICATION HISTORY \*\*\*

95-09-22 15:47            ID : 03-3456-7890

(TRANSMISSION)

| | No. | DATE | TIME | ID OF CALLED STATION | PAGE (P-F) | PAGE (F-F) | TIME | BETWEEN (P-F) | BETWEEN (F-F) | |
|---|---|---|---|---|---|---|---|---|---|---|
| d1— | 01 | 09-20 | 12:22 | 0559-66-9654 | | 10 | 04:03 | | OK | PC |
| d2— | 02 | 09-20 | 13:10 | 0559-66-3343 | | 00 | 00:00 | NG(ERR01) | | PC |
| d2— | 03 | 09-20 | 13:22 | 0555-11-9876 | 01 | 01 | 00:34 | OK | OK | |
| d2— | 04 | 09-20 | 14:15 | 76-8357 | 02 | 00 | 00:22 | OK | NG(ERR71) | PC |
| d1— | 05 | 09-20 | 14:27 | 0559-66-3343 | | 02 | 00:51 | | OK | |

(RECEIPT)

| | No. | DATE | TIME | ID OF CALLED STATION | PAGE (P-F) | PAGE (F-F) | TIME | BETWEEN (P-F) | BETWEEN (F-F) | |
|---|---|---|---|---|---|---|---|---|---|---|
| | 01 | 09-20 | 13:15 | 0559-66-1234 | | 01 | 00:34 | | OK | PC |
| | 02 | 09-20 | 13:45 | 34-5511 | 10 | 10 | 04:11 | OK | OK | |
| d3— | 03 | 09-20 | 14:59 | 0559-66-1234 | 01 | 13 | 05:05 | NG(ERR10) | OK | PC |
| | 04 | 09-20 | 15:31 | 59-8343 | 01 | 01 | 00:33 | OK | NG(ERR55) | PC |

80

F I G. 20

* REPORT OF COMMUNICATION HISTORY *

95-09-22 15:47                                                    ID : 03-3456-7890

(TRANSMISSION)

| No. | DATE | TIME | ID OF RECEIVING STATION | PAGE (P-F) | PAGE (F-F) | TIME | BETWEEN (P-F) | BETWEEN (F-F) | |
|---|---|---|---|---|---|---|---|---|---|
| 01 | 09-20 | 13:10 | 0559-66-3343 |    | 00 | 00:00 | NG (ERR01) |           | PC |
| 02 | 09-20 | 13:22 | 0555-11-9876 | 01 | 01 | 00:34 | OK         | OK        | PC |
| 03 | 09-20 | 14:15 | 76-8357      | 02 | 00 | 00:22 | OK         | NG (ERR71)| PC |

(RECEIPT)

| No. | DATE | TIME | ID OF RECEIVING STATION | PAGE (P-F) | PAGE (F-F) | TIME | BETWEEN (P-F) | BETWEEN (F-F) | |
|---|---|---|---|---|---|---|---|---|---|
| 01 | 09-20 | 13:45 | 34-5511      | 10 | 10 | 04:11 | OK         | OK        | PC |
| 02 | 09-20 | 14:59 | 0559-66-1234 | 01 | 13 | 05:05 | NG (ERR10) | OK        | PC |
| 03 | 09-20 | 15:31 | 59-8343      | 01 | 01 | 00:33 | OK         | NG (ERR55)| PC |

FIG. 22

* REPORT OF COMMUNICATION HISTORY *

95-09-22 15:47 ID : 03-3456-7890

(SINGLE TRANSMISSION)

| No. | DATE | TIME | ID OF RECEIVING STATION | PAGE (P-F) | PAGE (F-F) | TIME | BETWEEN (P-F) | BETWEEN (F-F) |
|---|---|---|---|---|---|---|---|---|
| 01 | 09-20 | 12:22 | 0559-66-9654 | | 10 | 04:03 | | OK |
| 02 | 09-20 | 14:27 | 0559-11-9876 | | 02 | 00:51 | | OK |

(SINGLE RECEIPT)

| No. | DATE | TIME | ID OF RECEIVING STATION | PAGE (P-F) | PAGE (F-F) | TIME | BETWEEN (P-F) | BETWEEN (F-F) |
|---|---|---|---|---|---|---|---|---|
| 01 | 09-20 | 13:15 | 0559-66-1234 | | 01 | 00:34 | | OK |

(PC TRANSMISSION)

| No. | DATE | TIME | ID OF RECEIVING STATION | PAGE (P-F) | PAGE (F-F) | TIME | BETWEEN (P-F) | BETWEEN (F-F) |
|---|---|---|---|---|---|---|---|---|
| 01 | 09-20 | 13:10 | 0559-66-3343 | | 00 | 00:00 | NG (ERR10) | BETWEEN (F-F) |
| 02 | 09-20 | 13:22 | 0555-11-9876 | 01 | 01 | 00:34 | OK | OK |
| 03 | 09-20 | 14:15 | 76-8357 | 02 | 00 | 00:22 | OK | NG (ERR71) |

(PC RECEIPT)

| No. | DATE | TIME | ID OF RECEIVING STATION | PAGE (P-F) | PAGE (F-F) | TIME | BETWEEN (P-F) | BETWEEN (F-F) |
|---|---|---|---|---|---|---|---|---|
| 01 | 09-20 | 13:45 | 34-5511 | 10 | 10 | 04:11 | OK | OK |
| 02 | 09-20 | 14:59 | 0559-66-1234 | 01 | 13 | 05:05 | NG (ERR10) | OK |
| 03 | 09-20 | 15:31 | 59-8343 | 01 | 01 | 00:33 | OK | NG (ERR55) |

FIG. 23

FACSIMILE APPARATUS

BACKGROUND OF THE INVENTION

The present invention relates to a facsimile apparatus which is capable of holding communication with an image processing apparatus, such as a personal computer, and more particularly to a facsimile apparatus having a function of facsimile-transmitting an image processed by an image processing apparatus and transferring an image facsimile-received from another facsimile apparatus to the image processing apparatus.

Some facsimile apparatuses have a function of facsimile-transmitting image data of an original document read by an original-document reading portion and a function of receiving image data processed by a personal computer through a communication interface so as to facsimile-transmit image data.

In general, the facsimile apparatus has a function of sequentially storing, in a communication history storage portion therein, information (date and time of communication, ID of the station with which the communication has been performed, number of communicated pages, period of the communication, and normal end "OK" or abnormal end "NG") indicating results of transmission and receipt between facsimile apparatuses and arbitrarily printing the results as a communication history report.

However, the communication history report output from a facsimile apparatus of the foregoing type does not enable a determination to be made with respect to whether the record is a transmission record of image data read from the original-document reading portion or a transmission record of image data received from the personal computer. Therefore, if a problem arises in the communication between, for example, the personal computer and the facsimile apparatus, the communication history report does not permit the cause of the communication problem to be detected. Therefore, a countermeasure for overcoming the error cannot quickly be performed.

When a document processed by a personal computer is facsimile-transmitted by using the facsimile apparatus of the foregoing type, an operator prepares the document by using the personal computer, and then instructs the facsimile apparatus to receive and facsimile-transmit the document. As a result, image data of the prepared document is transferred to the facsimile apparatus. The facsimile apparatus temporarily stores image data received from the personal computer in an image memory thereof. When receipt of image data from the personal computer has been completed, a receiving station instructed from the personal computer is called. After the line has been connected with the receiving station, image data in the image memory is facsimile-transmitted to the receiving station by a predetermined transmission control procedure.

Hitherto, a facsimile system of the foregoing type has not enabled the personal computer side to confirm whether or not image data supplied from the personal computer has been normally facsimile-transmitted to the receiving station. Therefore, when a result of the communication is required to be known, the operator must move to the position at which the facsimile apparatus is installed after the operator has instructed image data to be transferred from the personal computer in order to operate the facsimile apparatus to output a report of the transmission record so as to confirm the result of the communication.

Some facsimile apparatuses have a mode for automatically printing a transmission record report at each transmission operation. In a usual single transmission operation in which image data of an original document set to the original-document reading portion is facsimile-transmitted, whether or not the transmission has been completed normally can be directly confirmed by the operator. Therefore, since the mode for automatically printing the transmission record report is not always required, this mode is sometimes suspended to prevent waste of paper sheets. When the foregoing mode is suspended, the operator of the personal computer must move to the facsimile apparatus and operate the facsimile apparatus as described above to print a required transmission record report.

Some facsimile apparatuses have a single receiving mode for printing image data received from another facsimile apparatus on recording paper by a printing portion thereof and a personal computer receiving mode for transferring received image data to the personal computer which are selectively be switched. A facsimile apparatus of the foregoing type is structured to print image data received from another facsimile apparatus through a telephone line by the printing portion when the single receiving mode has been selected; and in a personal computer receiving mode, the facsimile apparatus transfers received image data to the personal computer through the communication interface.

However, even the facsimile apparatus of the foregoing conventional type capable of selecting the single receiving mode and the personal computer receiving mode has the following problem.

That is, only information indicating results of transmission and receipt between facsimile apparatuses is printed on the communication history report. Therefore, if received image data cannot be transferred to the personal computer in the personal computer receiving mode due to, for example, a breakdown of the personal computer or a problem of the communication interface for establishing the connection with the personal computer, the operation is determined to be normally ended on the communication history. If image data cannot be transferred to the personal computer, image data must be printed by the printing portion in order to prevent annihilation of the received image. Since the result of the communication between the facsimile apparatus and the personal computer is not reflected in the communication history report, it cannot be determined whether the received image printed by the printing portion is a received image printed because of the abnormal communication between the facsimile apparatus and the personal computer or image data printed by the printing portion in the single receiving mode only by confirming the communication history report.

BRIEF SUMMARY OF THE INVENTION

Accordingly, an object of the present invention is to provide a facsimile apparatus capable of performing communication with an image processing apparatus such as a personal computer and issuing a communication history report with which a transmission record of image data read by the original-document reading portion and a transmission record of image data received from the image processing apparatus can easily be distinguished from each other.

Another object of the present invention is to provide a facsimile apparatus which permits the image processing apparatus side to easily conform a result of facsimile transmission instructed by the image processing apparatus.

Another object of the present invention is provide a facsimile apparatus which permits a result of facsimile transmission performed by following an instruction from an image processing apparatus to be also confirmed by the facsimile apparatus side without a necessity of a complicated operation.

Another object of the present invention is to provide a facsimile apparatus capable of printing a communication history report for permitting a result of communication between facsimile apparatuses and a result of communication between the image processing apparatus and the facsimile apparatus to be identified.

In order to achieve the above object, according to one aspect of the present invention, there is provided a facsimile apparatus for performing data communication between another facsimile apparatus and an image processing apparatus, the facsimile apparatus comprising: reading means for reading an image of an original document and supplying image data of the original document; communication history storage means for distinguishably storing data communication history of image data of the original document supplied from the reading means and data communication history of image data supplied from the image processing apparatus; and communication history supply means for supplying communication history stored in the communication history storage means.

The facsimile apparatus according to the present invention has a function for transferring image data received through a telephone line to a personal computer serving as the image processing apparatus and transmitting image data processed by the personal computer to another facsimile apparatus through the telephone line. The facsimile apparatus according to the present invention has a communication history memory. The communication history memory stores "job No.", "identifier", "date", "time", "ID of station", "page A", "page B", "period", "status A", "status B" and "status C" corresponding to jobs in the transmission and receipt processes.

Among the items above, "status A" is information indicating a result of communication between a personal computer and a facsimile apparatus. "Status B" is information indicating a result of communication between facsimile apparatuses. "Status C" is information for identifying a supply source of image data to be facsimile transmitted. In the case of facsimile receipt, "status C" is information indicating a station from which received image data is transmitted.

When PC receipt mode has been set in the image receiving process, image data facsimile-received through the telephone line is transferred to an image memory in the facsimile apparatus. If "PC" is recorded as "status C" and normal transference has been performed, "OK" is recorded as "status B". If the operation is ended abnormally, "NG" is recorded as "status B" and its error code is recorded.

In the PC transmission process, image data processed by the personal computer is supplied to the image memory in the facsimile apparatus, and "PC" is recorded as "status C" If normal transmission has been performed, "OK" is recorded as "status A". If an error is made such that information of the receiving station, such as the receiving side facsimile number, is not supplied from the personal computer to the facsimile apparatus or image data cannot be transmitted, "NG" is recorded as "status A" and its error code is recorded. If a requirement is made from the personal computer to return a result of the transmission, a reply requirement flag is set.

The image transmission process is performed such that image data stored in the image memory in the facsimile apparatus as a result of the foregoing process is transmitted to another facsimile apparatus through the telephone line. If a reply requirement flag has been set, facsimile transmission result is notified to the personal computer.

The image output process is performed such that image data stored in the image memory in the facsimile apparatus is transferred to the personal computer. If normal transference has been performed, "OK" is stored as "status A". If normal transference is not performed, "NG" is stored as "status A" and its error code is stored. Image data which could not be transferred is printed on a paper sheet.

In accordance with "status A", "status B" and "status C" stored in the communication history memory, a communication history is printed and/or displayed on the display unit of the personal computer.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing areas in a storage portion of the facsimile apparatus:

FIG. 5 is a diagram showing areas in a communication history memory shown in FIG. 4;

FIG. 6 is a diagram showing areas in the transmission job management memory shown in FIG. 4;

FIG. 7 is a diagram showing areas in the receipt job management memory shown in FIG. 4;

FIG. 8 is a diagram showing areas in a receiving station information memory shown in FIG. 4;

FIG. 13 is a flow chart specifically showing a single transmission process shown in FIG. 9;

FIG. 16 is a diagram showing an example of a transmission record report which is output in the image transmission process shown in FIG. 14;

FIG. 17 is a diagram showing an example of a transmission record screen which is output in the image transmission process shown in FIG. 14;

FIG. 18 is a diagram showing an example of receipt record report which is output in the image output process shown in FIG. 15;

FIG. 20 is a diagram showing an example of a communication history report which is output in the communication history output process shown in FIG. 19;

FIG. 22 is a diagram showing an example of the communication history report which is output in the communication history output process shown in FIG. 20; and FIG. 23 is a diagram showing another example of output of the communication history report.

DETAILED DESCRIPTION OF THE INVENTION

An embodiment of the present invention will now be described with reference to the drawings.

Figure 1:
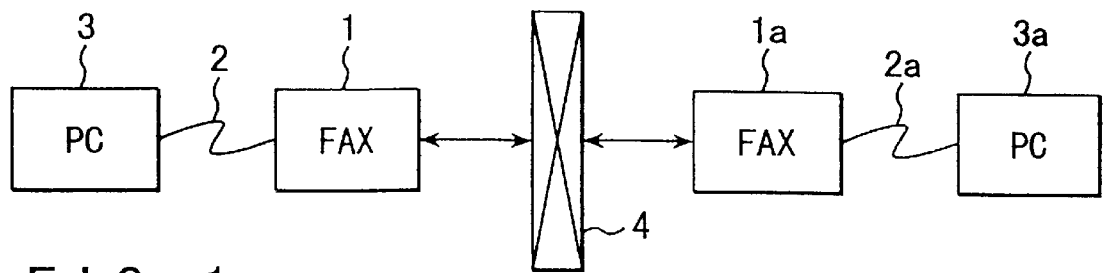
FIG. 1 is a schematic view showing a facsimile system including a facsimile apparatus according to the present invention.

As shown in FIG. 1, this embodiment has a structure such that a personal computer (PC) 3 serving as an image forming apparatus is connected to a facsimile apparatus (FAX) 1 according to the present invention through a communication interface cable 2, such as RS232C interface. The facsimile apparatus 1 has a known function (a single transmission mode) using a predetermined facsimile transmission procedure for transmitting, through a public telephone network 4, image data of an original document read by an original-document reading portion thereof to a connected facsimile apparatus 1a serving as a receiving station. Moreover, the facsimile apparatus 1 has a function (a personal computer transmission mode) for transmitting image data received from the personal computer 3 to the facsimile apparatus 1a through the public telephone network 4. Moreover, the facsimile apparatus 1 has a function (a single receipt mode) for printing image data received from the connected facsimile apparatus 1a serving as a sending station connected through the public telephone network 4 by a predetermined facsimile transmission control procedure. Moreover, the facsimile apparatus 1 has a function (a personal computer receipt mode) for transmitting image data received from the facsimile apparatus 1a serving as the sending station to a personal computer 3 through the communication interface cable 2.

Note that the personal computer 3a may be connected to the facsimile apparatus 1a with which communication is held or may be a sole apparatus to which the personal computer 3a is not connected.

Figure 2:
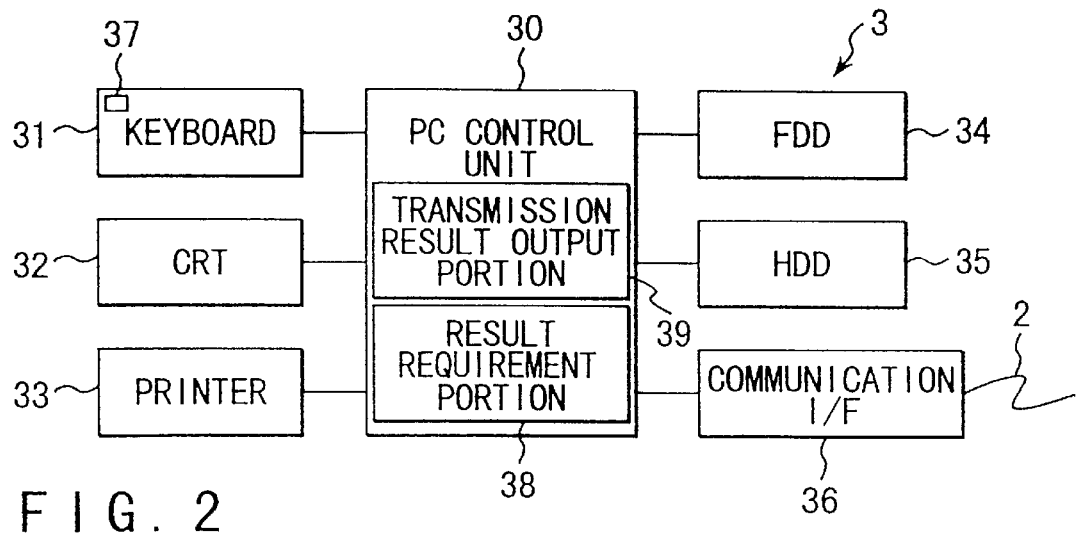
FIG. 2 is a block diagram showing an essential portion of a personal computer according to the embodiment.

FIG. 2 is a block diagram showing the structure of an essential portion of the personal computer 3. The personal computer 3 has a keyboard 31 with which character data, graphic data and the like are input, a CRT display 32 for displaying information or the like supplied by using keys of the keyboard 31, a printer 33 for printing out a document or the like produced by using keys and the like, a FDD (a floppy disk drive) 34 for writing/reading data to and from a floppy disk mounted from outside, a HDD (a hard disk drive) 35 for writing/reading data to and from a hard disk included in the personal computer 3, and a communication interface 36 for controlling communication of data signals held with the facsimile apparatus 1 through the communication interface cable 2. The above-mentioned blocks 31 to 36 are controlled by a personal-computer control unit 30 consisting of a CPU (a Central Processing Unit), a ROM (a Read Only Memory), a RAM (Random Access Memory) and so forth.

The keyboard 31 has a key 37 for requiring the facsimile apparatus 1 to notify a result of the communication of image data. The personal-computer control unit 30 has a result requirement means 38 for requiring the facsimile apparatus 1 to notify the result of communication of image data in response to the depression of the keys 37 and a communication result output means 39 for causing the CRT display 32 to display a result of communication of image data received from the facsimile apparatus 1.

Figure 3:
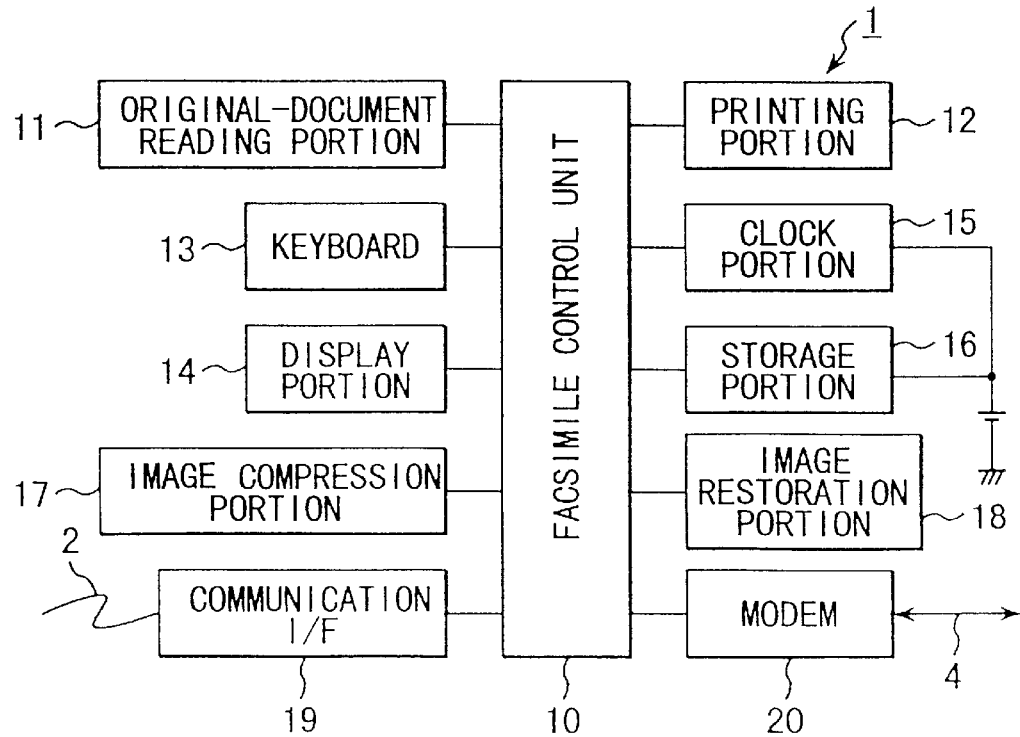
FIG. 3 is a block diagram showing an essential portion of the facsimile apparatus according to the embodiment.

FIG. 3 is a block diagram showing the structure of an essential portion of the facsimile apparatus 1. The facsimile apparatus 1 includes an original-document reading portion 11 for optically reading an image of a transmitted original document, a printing portion 12 for printing an image on recording paper, a keyboard 13 having a ten key pad, a one-touch key, a transmission key and selection keys for selecting various modes, a display portion 14 for displaying information of the telephone number of the receiving station and various message information items, a clock portion 15 for counting time and date, a storage portion 16 for storing various data items, an image compression portion 17 for compressing image data to be facsimile-transmitted, an image restoring portion 18 for restoring compressed image data, a communication interface 19 for controlling communication of data signals to and from the personal computer 3 through the communication interface cable 2 and a modem 20 connected to the public telephone network 4. The foregoing blocks 11 to 20 are controlled by a facsimile control unit 10 composed of a microcomputer and the like.

The storage portion 16 comprises a RAM and the clock portion 15 are backed up by a battery 21.

As shown in FIG. 4, the storage portion 16 has a communication history memory 41 serving as a communication history storage portion for storing information indicating a communication result of facsimile transmission and receipt. Moreover, the storage portion 16 has a transmission job management memory 42 for storing information of processes (jobs) of facsimile-transmitting image data, a receipt job management memory 43 for storing information of processes (jobs) performed as a result of the facsimile-receipt of image data, a receiving station information memory 44 for storing information of receiving station to which image data will be facsimile-transmitted, an image memory 45 serving as an image data storage means for storing image data of an original document for a plurality of pages to be transmitted, a transmission buffer 46 for temporarily storing image data for a plurality of lines to be facsimile-transmitted, a receipt buffer 47 for temporarily storing image data facsimile-transmitted, a job-No. memory 48 for storing latest job No. with which a process of the facsimile transmission mode and receipt, a header address memory 49 for storing header address STA for use when image data for one communication operation is written on the image memory 45, a page counter 50 for counting the number of pages (p), a timer counter 51 for counting time and a flag memory 52 for storing reply requirement flag f which is set to "1" when a requirement has been made from the personal computer 3 to notify a result of the facsimile-transmission.

As shown in FIG. 5, the communication history memory 41 is an area for, in the generation order, storing records of communication history each consisting of "identifier", "date", "time", "ID of station", "page A", "page B", "time", "status A", "status B", "status C" and "job No.".

Information "identifier" is information for identifying whether the record is a record relating facsimile transmission or a record relating facsimile receipt, and "1" indicates facsimile transmission, and "2" indicates facsimile receipt. Information "date" and "time (or time point)" indicate data and time at which the facsimile transmission or receipt has started, and "ID of station" indicates the telephone number of a receiving station in the case of the facsimile transmission and the telephone number of the sending station in the case of the facsimile receipt.

Information "page A" indicates the number of pages of image data transferred in one communication between the personal computer 3 and the facsimile apparatus 1, "page B" indicates the number of pages of image data transferred in one communication between facsimile apparatuses, and "time (or period)" indicates time required to time perform one communication between the facsimile apparatuses.

Information "status A" is information indicating a result of communication between the personal computer 3 and the facsimile apparatus 1. When the communication has been ended normally, information "OK" is stored. When the communication has been ended abnormally, information "NG" and its error code are stored. Information "status B" is information indicating a result of communication between facsimile apparatuses. When the communication has been ended normally, information "OK" is stored. If the communication has been ended abnormally, information "NG" and its error code are stored.

Information "status C" is information with which the source of image data required to be transmitted is identified in the case of the facsimile transmission, while it is information with which destination of received image data is identified in the case of the facsimile receipt. In either case, information "PC" is stored in the case of the personal computer 3. Information "job No." indicates peculiar number n set for a facsimile transmission process or a facsimile receipt process corresponding to the foregoing record.

The communication history memory 41 has a first result area 41a for storing information "status A" indicating a result of communication of image data between the personal computer 3 and the facsimile apparatus 1, a second result area 41b for storing information "status B" indicating a result of communication of image data between the facsimile apparatuses 1 and 1a and an identification area 41c for storing information "status C" for identifying supply source of image data. When transmitted or received image data is image data received from the personal computer 3 or image data transferred to the personal computer 3, information "status A" indicating a result of communication of image data above is stored in the first result area 41a. Moreover, information "PC" for identifying the supply source or the destination of image data above is stored in the identification area 41c forming a pair together with the first result area 41a.

As shown in FIG. 6, the transmission job management memory 42 is an area for, in the transmitting order, storing transmission job management records each consisting of "job No.", "ID of station", "PAGE", "header address STA" and "OP flag", the transmission job management record being stored until the facsimile transmission of image data managed by the record is completed.

Information "job No." indicates peculiar number n set for a facsimile transmission process corresponding to the record. information "ID of station" indicates the telephone number of the destined station (the receiving station) to which facsimile transmission is performed. Information "PAGE" indicates the number of pages of image data for one communication to be facsimile-transmitted. Information "header address STA" indicates the header end address of the image memory 45 which has stored image data to be facsimile-transmitted. Information "job No." and "ID of station" shown in FIG. 6 correspond to information "job No." and "ID of station" shown in FIG. 5. Information "status D" is information for identifying the supply source of image data to be facsimile-transmitted and information "PC" is stored in only the case of the personal computer 3.

Information "OP flag" is information for identifying whether information of a result of the facsimile transmission is notified to the personal computer 3 or is output to the printer 33. When notification is performed, "1" is stored.

As shown in FIG. 7, the receipt job management memory 43 is an area for, in the order of receipt, storing a receipt job management records each consisting of information "job No.", "PAGE" and "header address STA", until received image data, which is managed with the record, is transmitted to the personal computer 3. Information "job No." shown in FIG. 7 corresponds to information "job No." shown in FIG. 5.

Information "job No." indicates peculiar number n set to the facsimile receipt process corresponding to the record. information "PAGE" indicates the number of pages of image data in one communication which has been facsimile-received. information "header address STA" indicates the header end address of the image memory 45 which has stored image data which has been facsimile-received.

As shown in FIG. 8, the receiving station information memory 44 is an area for storing information of receiving station including the telephone number of the receiving station, with which image data received from the personal computer 3 is facsimile-transmitted, and the rank of the provided modem, information above being stored together with the job number until the facsimile transmission is completed. Information of the receiving station stored in the receiving station information memory 44 is read when a facsimile transmission process is performed in accordance with job management data of the corresponding job number so as to be used as information for connecting the line with the receiving station.

Thus, an instruction of an automatic receipt mode is input to the facsimile apparatus 1 when the key of the keyboard 13 has been depressed so that the facsimile control unit 10 executes a process in accordance with flow charts shown in FIGS. 9 to 15.

Figure 9:
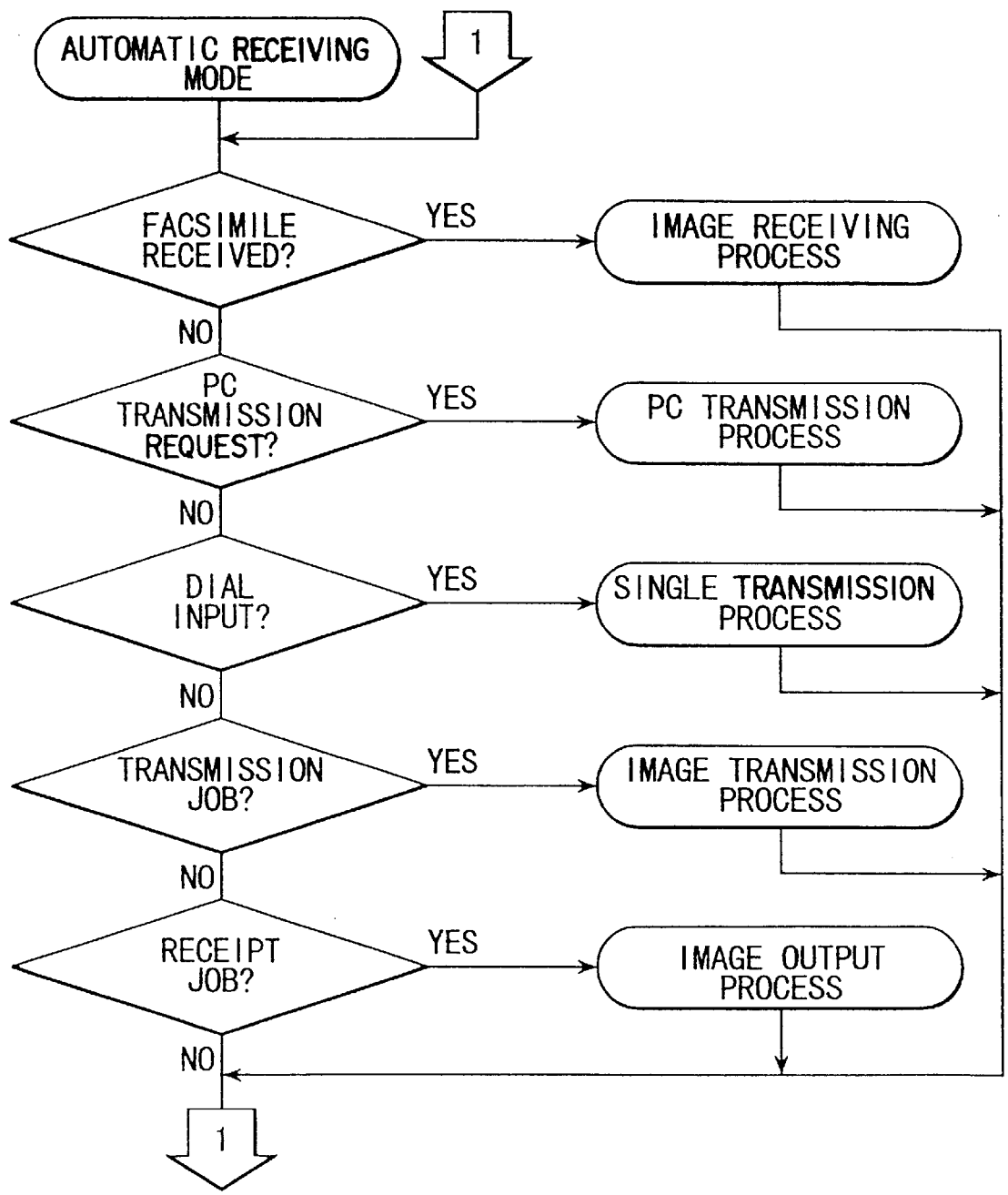
FIG. 9 is a flow chart showing a main process which is performed by a facsimile control unit of the facsimile apparatus.
Figure 10:
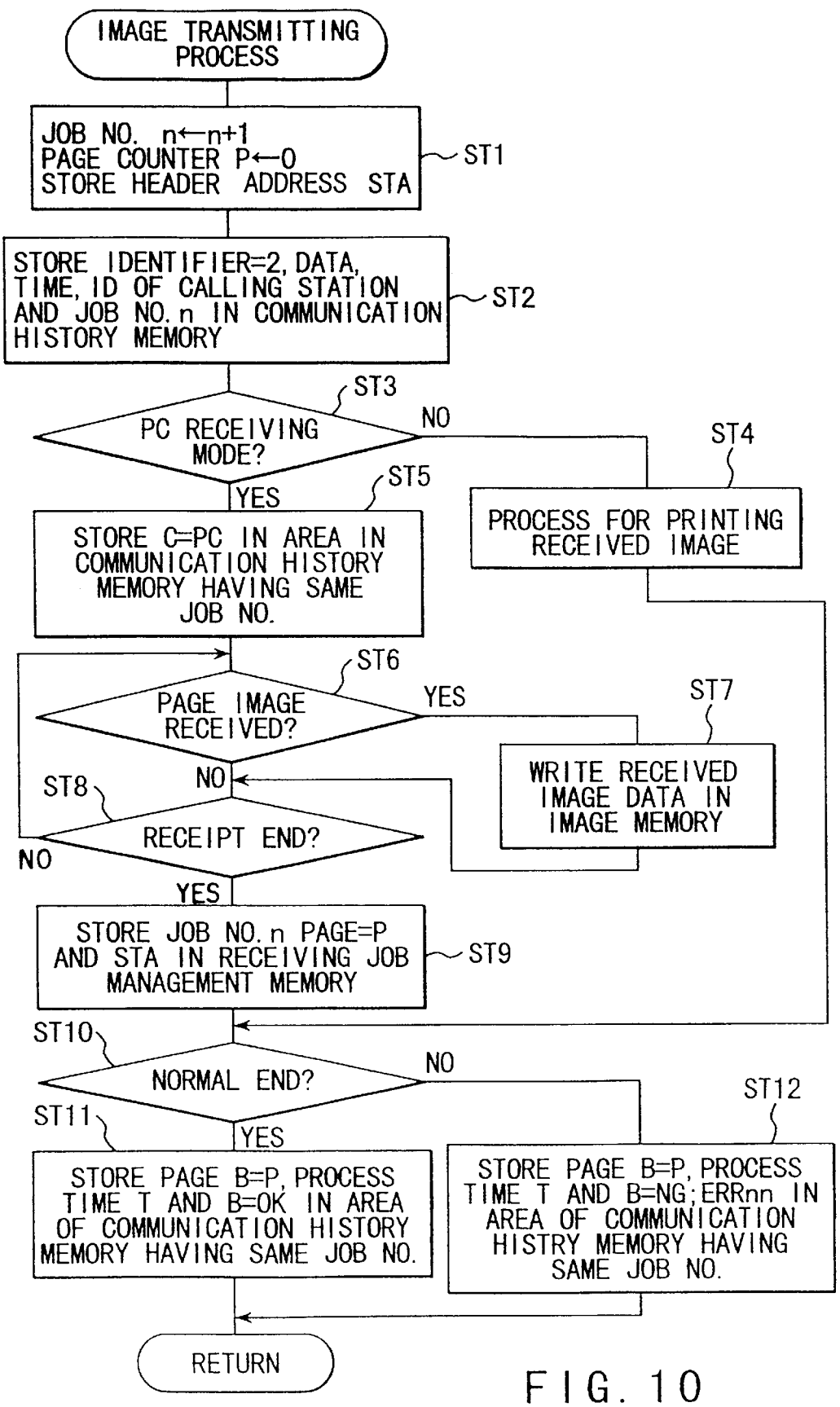
FIG. 10 is a flow chart specifically showing an image receiving process shown in FIG. 9.

That is, in an operation standby state shown in FIG. 9, that is, in a state where the program is being looped as indicated by an arrow "1", when the facsimile control unit 10 has recognized that image data is facsimile-received from the other facsimile apparatus 1a connected through the public telephone network 4, the facsimile control unit 10 executes an image receiving process specifically shown in FIG. 10.

Initially, the facsimile control unit 10 increases the job number of the page counter 50 by "+1". Moreover, the facsimile control unit 10 clears the count value process of the page counter 50 to "0", and then stores the header address STA of an empty area in the image memory 45 into the header address memory 49 (step ST1).

Then, identifier=2 (receipt), date and time read from the clock portion 15, the telephone number of the sending station and job number n in the job-No. of the memory 48 respectively are stored in areas for the "identifier", "date", "time", "ID of station" and "job No." in the communication history memory 41 (step ST2).

In step ST3 whether or not a personal computer receipt mode for transferring image data, which has been facsimile-received, to the personal computer 3 has been set is determined. If the foregoing mode has not been selected, a single receipt mode has been set so that a known received image printing process is performed (step ST4).

That is, the timer counter 51 starts performing the time counting operation. Whenever image data is received from the facsimile apparatus 1a, received image data is restored by the image restoring portion 18, followed by temporarily storing image data for several lines in the receipt buffer 47. Then, image data is sequentially transferred to the printing portion 12 so that image data is printed on the recording paper. At this time, whenever the page break command of image data is received, the count of the page counter 50 is increased.

When all of facsimile-received image data items have been printed on the recording paper, the time counting operation which has been performed by the timer counter 51 is interrupted. In step ST10 whether or not the present facsimile receipt operation has been completed normally is determined.

If the facsimile receipt operation has been finished normally, job number n in the job-No. memory 48 is read in step ST11. Then, count p of the page counter 50, count T of the timer counter 51 and information "OK" indicating normal completion are stored in the areas "page B", "period" and "status B" of the communication history memory 41 corresponding to the foregoing job number. Thus, the foregoing process is ended.

If the facsimile receipt has been completed abnormally for example such that the communication line has been disconnected without receipt of an end command of the facsimile transmission from the sending station, job number n in the job-No. memory 48 is read in step ST12. Then, count p of the page counter 50, count T of the timer counter 51, information "NG" indicating abnormal completion, and error code "ERRnn" are stored in areas "page B", "period" and "status B" of the communication history memory 41 corresponding to the job number. Then, the foregoing process is completed.

If the personal computer receipt mode has been selected in step ST3, job number n in the job-No. memory 48 is read and information "PC" indicating that the image data will be transmitted to the personal computer 3 is stored in the area "status C" in the communication history memory 41 corresponding to the job number.

When the timer counter 51 has started counting time, receipt of image data for one page from the other facsimile apparatus 1a is waited for. Whenever image data is received, it is restored by the image restoring portion 18. Then, image data above is sequentially stored in the image memory 45 starting form its header address STA. Whenever image data for one page is stored, the count of the page counter 50 is increased (step ST7).

Whenever image data is received from the other facsimile apparatus 1a, image data is, in page units, stored in the image memory 45. When completion of the operation for receiving image data has been detected, the time counting operation, which has been performed by the timer counter 51, is interrupted. Then, job number n in the job-No. memory 48, count p of the page counter 50 and header address STA in the header address memory 49 respectively are stored in areas "job No.", "PAGE" and "header address STA" in the receipt job management memory 43 (step ST9).

Then, the operation proceeds to step ST10 so that an operation in step ST11 is performed if the operation has been completed normally. If the operation has been completed abnormally, an operation in step ST11 is performed. Thus, the foregoing process is completed.

Figure 11:
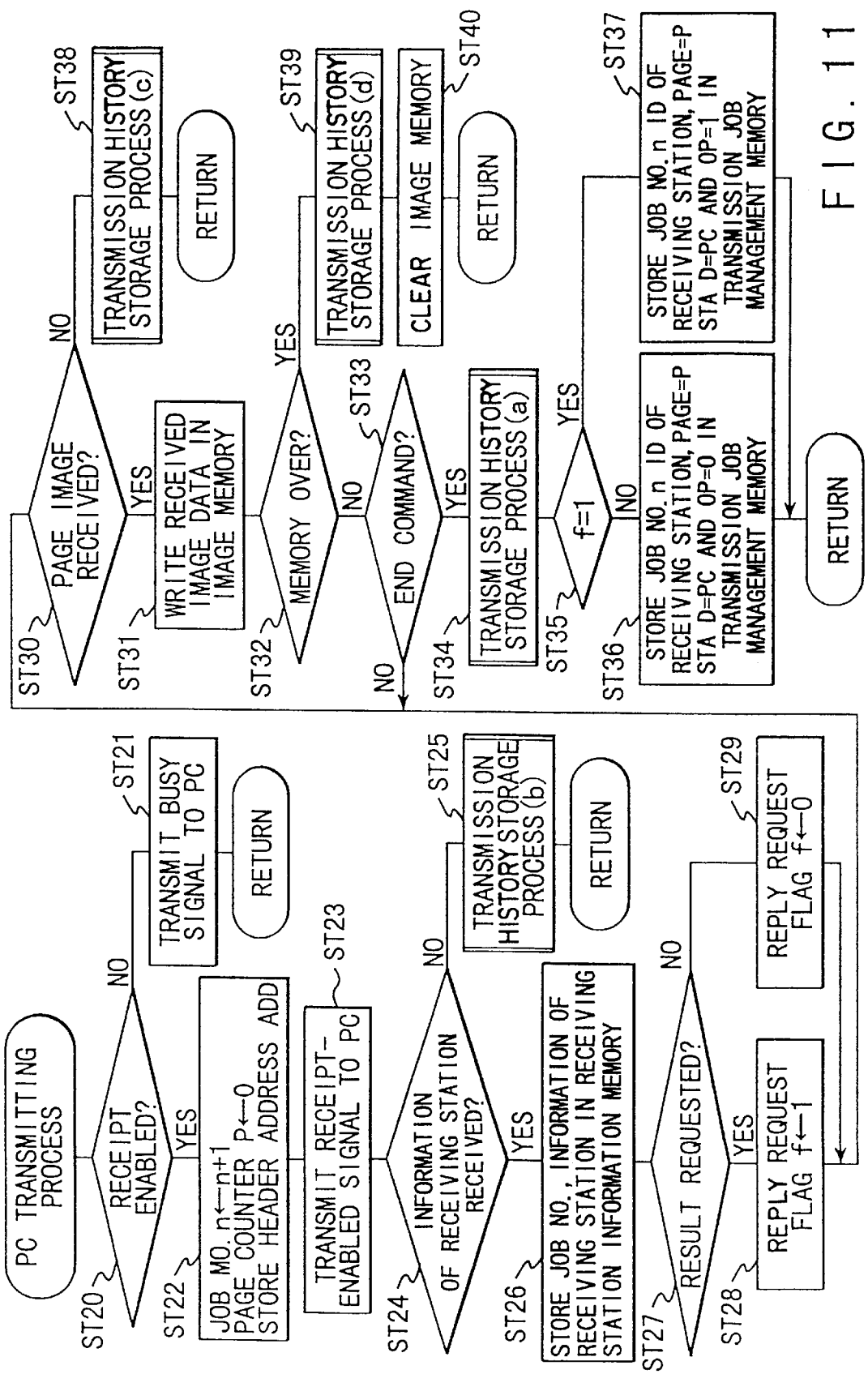
FIG. 11 is a flow chart specifically showing a personal computer transmission process shown in FIG. 9.

When facsimile control unit 10 in the operation standby state shown in FIG. 9 has received a requirement to facsimile-transmit image data from the personal computer 3 connected through the communication interface cable 2, the facsimile control unit 10 executes a personal computer transmission process specifically shown in FIG. 11.

In step ST20, whether or not image data can be received from the personal computer 3 is determined. If the original-document reading portion 11 is reading an image of an original document required to be transmitted and thus receipt cannot be performed, a busy signal is transmitted to the personal computer 3 through the communication interface 19. Then, the foregoing process is completed.

If an image can be received from the personal computer 3 in step ST20, job number n of the job-No. memory 48 is increased by only "+1". Moreover, the count p of the page counter 50 is cleared to "0", and then header address STA of the empty area in the image memory 45 is stored in the header address memory 49 (step ST22).

Then, a receipt-enabled signal is transmitted to the personal computer 3 through the communication interface 19. When information of the receiving station including the telephone number with which the receiving station, to which the facsimile transmission is performed, is specified and the rank of the modem has been correspondently received in step ST24 from the personal computer 3 within a predetermined time period, job number n is read from the job-No. memory 48. In accordance with the read job number n, the received information items of the receiving station are stored in the receiving station information memory 44.

In step ST27 whether or not a reply requirement (a communication result requirement) command has been received from the personal computer 3 together with information of the receiving station is determined. If it has been received, the reply requirement flag f in the flag memory 52 is set to "1". If it has not been received, the reply requirement flag f is reset to "0" (steps ST28 and ST29). The state where the reply requirement flag f is "1" indicates that the result of the communication is returned to the personal computer 3, while the state where the same is "0" indicates that the result of the communication is not returned to the personal computer 3.

In step ST30 receipt of image data for one page from the personal computer 3 is waited for. Whenever image data is received, it is sequentially stored in the image memory 45 starting from its header address STA. At this time, whenever image data for one page is stored, the count of the page counter 50 is increased (step ST31).

Figure 12A:
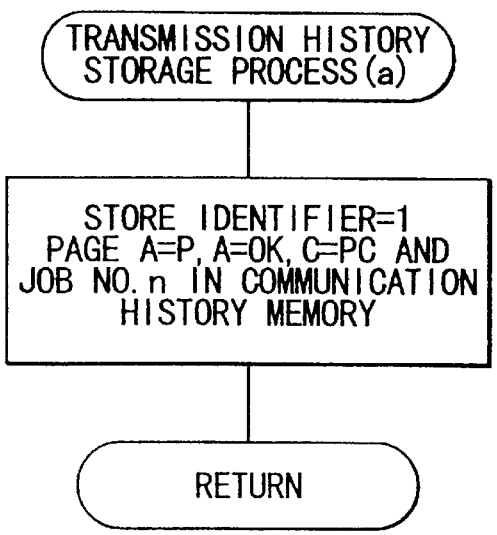
FIGS. 12A to 12D are flow charts specifically showing transmission history storage process shown in FIG. 11.

Whenever image data is received from the personal computer 3, received image data is, in page units, stored in the image memory 45. Then, if an end command has been received from the personal computer 3 such that the image memory 45 is not fully filled in step ST32, transmission history storage process (a) shown in FIG. 12A is performed (step ST34). That is, identifier=1 (transmission), count p of the page counter 50, information "OK" indicating normal end, information "PC" indicating that supply source of image data is the personal computer 3 and job number n in the job-No. memory 48 respectively are stored in the areas "identifier", "page A", "status A", "status C" and "job No." in the communication history memory 41.

In step ST35 the reply requirement flag f in the flag memory 52 is examined. If the reply requirement flag f is reset to "0", the result of the facsimile communication is not required to be notified to the personal computer 3. Therefore, job number n in the job-No. memory 48, the telephone number in information of the receiving station corresponding to the job number and stored in the receiving station information memory 44, count p of the page counter 50, header address STA in the header address memory 49, information "PC" indicating that the supply source of image data is the personal computer 3 and information "0" indicating that reply of the result of the transmission respectively is not required are stored in the areas "job No.", "ID of receiving station", "PAGE", "header address STA", "status D" and "OP flag" of the transmission job management memory 42 shown in FIG. 6. Then, the foregoing process is completed.

If the reply requirement flag f has been set to "1" in step ST35, the result of the facsimile transmission must be notified to the personal computer 3. Therefore, job number n in the job-No. memory 48, the telephone number in information of the receiving station corresponding to the job number and stored in the receiving station information memory 44, count p of the page counter 50, header address STA in the header address memory 49, information "PC" indicating that the supply source of image data is the personal computer 3 and information "1" indicating that reply of the result of the transmission is required respectively are stored in the areas "job No.", "ID of receiving station", "PAGE", "header address STA", "status D" and "OP flag" of the transmission job management memory 42. Then, the foregoing process is completed (step ST36).

Figure 12B:
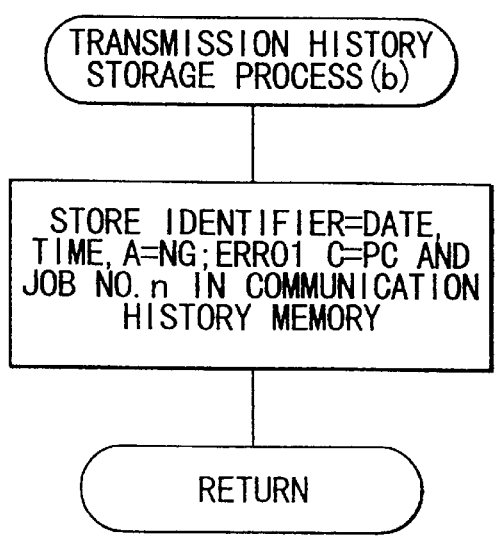

If information of the receiving station has not been, in step ST24, transmitted from the personal computer 3 within a predetermined time, transmission history storage process (b) shown in FIG. 12B is performed (step ST25). That is, identifier=1 (transmission), date and time read from the clock portion 15, "NG" indicating abnormal end, its error code "ERR01", information "PC" indicating that the supply source of image data is the personal computer 3 and job number n in the job-No. memory 48 respectively are stored in the areas of "identifier", "date", "time", "status A", "status C" and "job No." in the communication history memory 41. Thus, the foregoing process is completed.

Figures 12C, 12D:
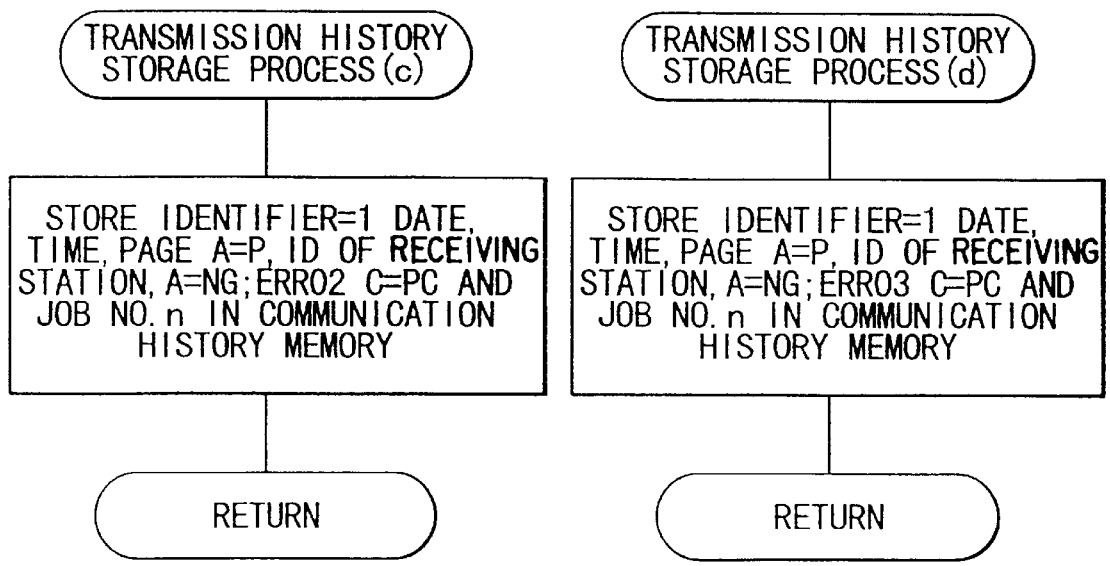

If the interval of transmitting image data from the personal computer 3 exceeds a predetermined time in step ST30, transmission history storage process (c) shown in FIG. 12C is performed (step ST38). That is, identifier=1 (transmission), date and time read from the clock portion 15, count p of the page counter 50, the telephone number included in information of the receiving station corresponding to the job number stored in the receiving station information memory 44, information "NG" indicating abnormal end, its error code "ERR02", information "PC" indicating the supply source of image data is the personal computer 3 and job number n in the job-No. memory 48 respectively are stored in the areas "identifier", "date", "time", "page A", "ID of receiving station", "status A", "status C" and "job No." in the communication history memory 41. Then, image data stored this time is deleted from the image memory 45, and data having the foregoing job number is deleted from the receiving station information memory 44. Thus, the foregoing process is completed (step ST40).

If a fact that the image memory 45 has been fully filled in step ST32, transmission history storage process (d) shown in FIG. 12D is performed (step ST39). That is, identifier=1 (transmission), date and time read from the clock portion 15, count p of the page counter 50, the telephone number included in information of the receiving station corresponding to the job number stored in the receiving station information memory 44, information "NG" indicating abnormal end, its error code "ERR03", information "PC" indicating the supply source of image data is the personal computer 3 and job number n in the job-No. memory 48 respectively are stored in the areas "identifier", "date", "time", "page A", "ID of receiving station", "status A", "status C" and "job No." in the communication history memory 41. Then, image data stored this time is deleted from the image memory 45, and data having the foregoing job number is deleted from the receiving station information memory 44. Thus, the foregoing process is completed.

When the facsimile control unit 10 has detected that the telephone number of the receiving station has been input from the keyboard 13 (that is, when the dial input has been detected) in the operation standby state shown in FIG. 9, the facsimile control unit 10 performs the single transmission process specifically shown in FIG. 13.

Initially, whether or original document has been correctly set in the original-document reading portion 11 is determined. If the original document has not been set correctly, an error message, for example, "Set Original Document" is displayed on the display portion 14. Then, the foregoing process is completed.

If an original document has been set correctly in the original-document reading portion 11, job number n of the job-No. memory 48 is increased by only "+1". Moreover, the count p of the page counter 50 is cleared to "0", and then the header address STA of the empty area in the image memory 45 is stored in the header address memory 49 (step ST51).

Then, the operation of the original-document reading portion 11 is controlled in step ST52 so as to, one by one, read image data of the original document set to the original-document reading portion 11. In step ST53 read image data is stored in the image memory 45 starting from the header address STA. At this time, whenever image data for one page is stored, the count of the page counter 50 is increased.

In a period in which the original document has been set in the original-document reading portion 11, the processes in steps ST52 and ST53 are repeated. If no original document is detected in the original-document reading portion 11, job number n in the job-No. memory 48, the telephone number of the receiving station input by the operation of the keys, count p of the page counter 50 and header address STA in the header address memory 49 respectively are stored in the areas "job No.", "ID of receiving station", "PAGE" and "header address STA" in the transmission job management memory 42 shown in FIG. 6 (step ST55). Thus, the foregoing process is completed.

Figure 14:
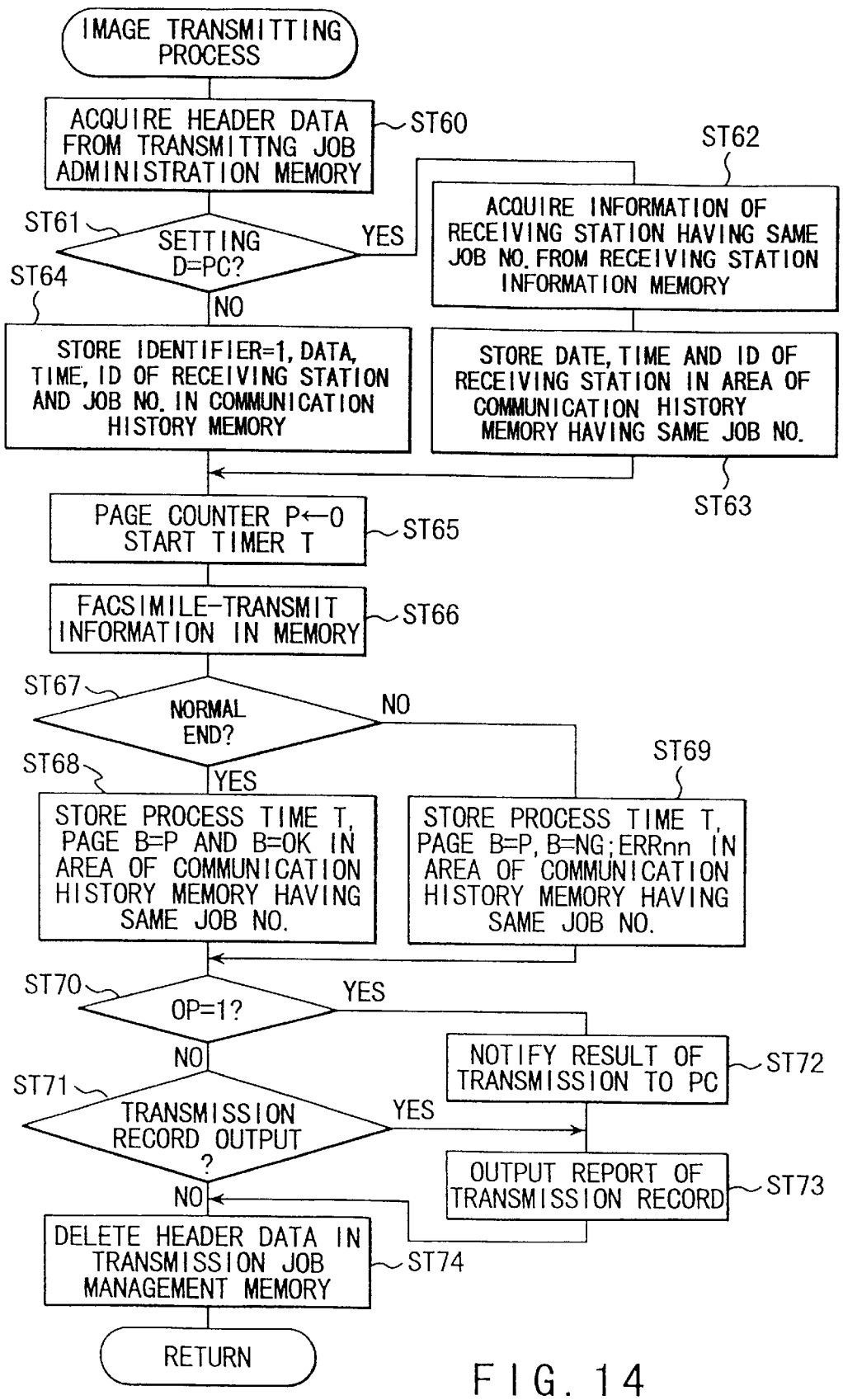
FIG. 14 is a flow chart specifically showing the image transmission process shown in FIG. 9.

When the facsimile control unit 10 has recognized that transmission job management data has been stored in the transmission job management memory 42 in the operation standby state shown in FIG. 9 (that is, when image data to be facsimile-transmitted has been stored in the image memory 45), the facsimile control unit 10 performs an image transmission process specifically shown in FIG. 14.

Initially, transmission job management data (job number, ID of the receiving station, page, header address STA, status D and OP flag) are acquired from the transmission job management memory 42. In step ST61 "status D" in the acquired transmission job management data is examined.

If information "PC" has been set in "status D", the facsimile transmission managed with the transmission job management data is facsimile transmission of image data transmitted from the personal computer 3. Therefore, information of the receiving station corresponding to the "job No." in the transmission job management data is read from the receiving station information memory 44 shown in FIG. 8 (step ST62). Moreover, date and time read from the clock portion 15 and information of ID of the receiving station included in transmission job management data respectively are stored in the areas "date", "time" and "ID of receiving station" corresponding to the area storing the same job number in the communication history memory 41 (step ST63).

If information "PC" is not set to "status Document", the facsimile transmission managed with the transmission job management data is facsimile transmission of image data of an original document read by the original-document reading portion 11. Therefore, identifier=1 (transmission), date and time read from the clock portion 15, information of ID of the receiving station and information of job No. in transmission job management data respectively are stored in the areas "identifier", "date", "time", ID of called the station and "job No." in the communication history memory 41 (step ST64).

In step ST65, the page counter 50 is cleared to "0". Moreover, the timing counting operation of the timer counter 51 is started to perform memory transmission process of image data by a predetermined facsimile transmission control procedure.

An example of the transmission process will now be described. The facsimile control unit 10 of the facsimile apparatus 1, which is the sending station, calls a station through the public telephone network 4 in accordance with the ID of the receiving station included in transmission job management data. As a result, NSF (Non-Standard Facilities), CSI (Called Subscriber Identification), DIS (Digital Identification Signal) transmitted from the receiving station are received so that the facsimile control unit 10 transmits NSS (Non-Standard Facilities Set-up), TSI (Transmitting Subscriber Identification) and DCS (Digital Command Signal). Then, the facsimile control unit 10 transmits, to the receiving station, TCF (Training Check). When CFR (Confirmation to Receipt) has been received from the receiving station, the facsimile control unit 10 sequentially reads image data from the image memory 45 in accordance with the header address STA in transmission job management data. Then, the image compression portion 17 compresses image data above, followed by sequentially transmitting compressed data to the receiving station. At this time, whenever image data for one page is transmitted, the count of the page counter 50 is increased. After image data for one communication has been transmitted, the facsimile control unit 10 transmits EOP (End Of Procedures) to the receiving station. When MCF (Message Confirmation) has been received from the receiving station, the facsimile control unit 10 transmits DCN (Disconnection) to the receiving station so that the line connection with the receiving station is disconnected. Moreover the time counting operation of the timer counter 51 is interrupted.

In step ST67 the facsimile control unit 10 determines whether or not the facsimile transmission of image data above has been ended normally. If it has determines normal end, the facsimile control unit 10 reads job number n from the job-No. memory 48. Then, count p of the page counter 50, count T of the timer counter 51 and information "OK" indicating normal end respectively are stored in the areas "page B", "time" and "status B" in the communication history memory 41 (step ST68). If the facsimile transmission has been ended abnormally, job number n is similarly read from the job-No. memory 48 and count p of the page counter 50, count T of the timer counter 51, information "NG" indicating abnormal end and its error code "ERRnn" respectively are stored in the areas "page B" corresponding to the foregoing job number, "time" and "status B" in the communication history memory 41 (step ST69).

Then, the facsimile control unit 10 examines the OP flag in transmission job management data in step ST70. If the OP flag has not been set to "1", whether or not the automatic transmission record output mode of the transmission record report has been selected is determined in step ST71. If the automatic transmission record output mode has not been selected, image data for one communication from the header address STA in transmission job management data is deleted from the image memory 45. Moreover, header transmission job management data is deleted from the transmission job management memory 42 and then the foregoing process is ended.

If the automatic transmission record output mode has been selected in step ST71, communication history data which coincides with the job number in transmission job management data is acquired from the communication history memory 41. In accordance with communication history data, print data of a transmission record report is edited in accordance with communication history data. Print data above is transmitted to the printing portion 12 so as to be printed on recording paper. Thus, a transmission record report 61, for example, as shown in FIG. 16, is discharged. Then, image data for one communication from the header address STA in transmission job management data is deleted from the image memory 45. Moreover, header transmission job management data is deleted from the transmission job management memory 42. Thus, the foregoing process is completed.

If the OP flag has been set to "1" in step ST70, communication history data having the job number which coincides with the job number in transmission job management data is acquired from the communication history memory 41. In accordance with communication history data, output data of the transmission record report is edited. Output data above is transmitted to the personal computer 3 through the communication interface 19 (step ST72).

Then, print data of the transmission record report is edited in accordance with communication history data acquired from the communication history memory 41. Print data above is supplied to the printing portion 12 so as to be printed on recording paper so that the transmission record report 61 is discharged. In another embodiment, when the OP flag has been set to "1", the step ST73 of outputting the report of transmission record may omitted.

Then, image data for one communication from the header address STA in transmission job management data is deleted from the image memory 45. Moreover, header transmission job management data is deleted from the transmission job management memory 42. Thus, the foregoing process is completed.

Figure 15:
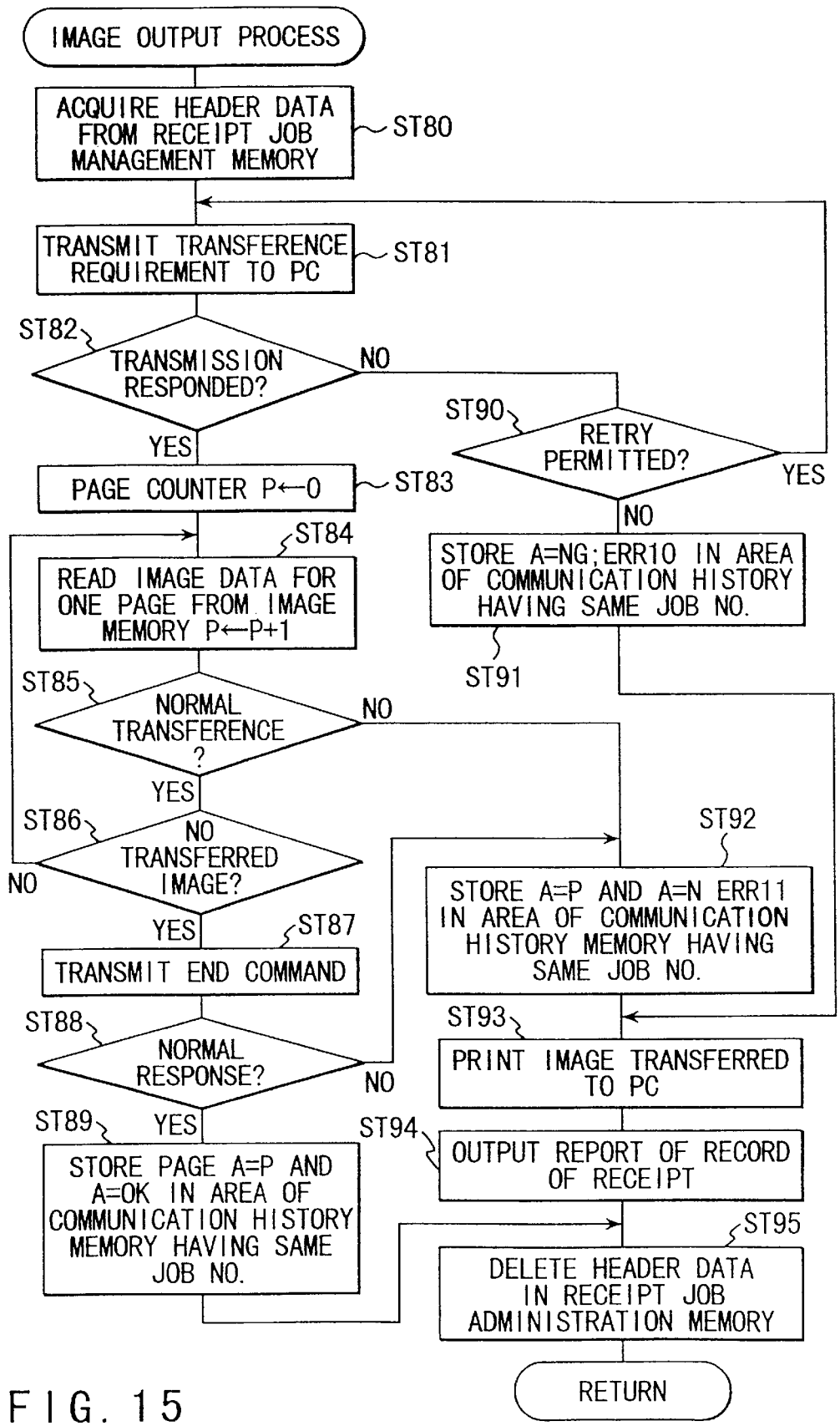
FIG. 15 is a flow chart specifically showing the image output process shown in FIG. 9.

When the facsimile control unit 10 in the operation standby state shown in FIG. 9 has recognized that receipt job management data has been stored in the receipt job management memory 43 (that is, when facsimile-received image data has been stored in the image memory 45), the facsimile control unit 10 performs an image output process specifically shown in FIG. 15.

Initially, header receipt job management data (job number, page and header address STA) is acquired from the receipt job management memory 43. In step ST81 the transference requirement command for transferring image data is transmitted to the personal computer 3 through the communication interface 19. When a reply signal permitting transference has been correspondently received from the personal computer 3, the page counter 50 is cleared to "0" (step ST83).

In step ST84 image data is sequentially read from the image memory 45 in accordance with the header address STA in the receipt job management data so as to transfer the same to the personal computer 3 through the communication interface 19. At this time, whenever image data for one page is transferred, the count of the page counter 50 is increased.

After image data for one communication has been transferred, an end command is transferred to the personal computer 3. When a response signal denoting normal end has been correspondently received from the personal computer 3 in step ST88, count p of the page counter 50 and information "OK" indicating normal end are, in step ST89, stored in the areas of "page A" and "status A" in the communication history memory 41 corresponding to the job number in receipt job management data. Then, image data for one communication from the header address STA in receipt job management data is deleted from the image memory 45, and then header receipt job management data is deleted from the receipt job management memory 43. Thus, the foregoing process is completed.

If a response signal denoting inhibition of transference has been received as a result of transmission of a transference requirement signal to the personal computer 3 in step ST81, retrial is repeated by a predetermined number of times (step ST90). If the transference inhibition state cannot be suspended, information "NG" indicating abnormal end and corresponding error code "ERR10" are, in step ST91, stored in the area of "status A" in the communication history memory 41 corresponding to the job number in receipt job management data (step ST91). Then, in accordance with header address STA in receipt job management data, image data is sequentially read from header address STA from the image memory 45 to be transmitted to the printing portion 12 so as to be printed on recording paper (step ST93). After image data for one communication to be transferred to the personal computer 3 has been printed on the recording paper, communication history data having the job number which coincides with the job number in receipt job management data is acquired from the communication history memory 41. In accordance with communication history data, print data of a report of the receipt record is edited. Print data above is supplied to the printing portion 12 so as to be printed on recording paper so that a report 70 of the record of receipt as shown in FIG. 18 is discharged (step ST94). Then, image for one communication is deleted from the image memory 45 in accordance with the header address STA in receipt job management data. Moreover, header receipt job management data is deleted from the receipt job management memory 43. Thus, the foregoing process is completed (step ST95).

If a problem arises during transference of image data read from image memory 45 to the personal computer 3 in step ST84 or if a response signal denoting abnormal end has been received from the personal computer 3 in step ST88 after transference of image data for one communication to the personal computer 3, count p of the page counter 50, information "NG" indicating abnormal end and corresponding error code "ERR11" respectively are stored in the areas of "page A" and "status A" In the communication history memory 41 corresponding to the job number in receipt job management data (step ST92). Then, in accordance with header address STA in receipt job management data, image data is sequentially read from the image memory 45 so as to be transferred to the printing portion 12 and printed on recording paper. After image data for one communication to be transferred to the personal computer 3 has been printed on the recording paper, the corresponding report 70 of the record of receipt is printed in step ST94. Then, image data for one communication is deleted from the image memory 45 in accordance with the header address STA in receipt job management data. Moreover, header receipt job management data is deleted from the receipt job management memory 43 (step ST95). Thus, the foregoing process is completed.

Figure 19:
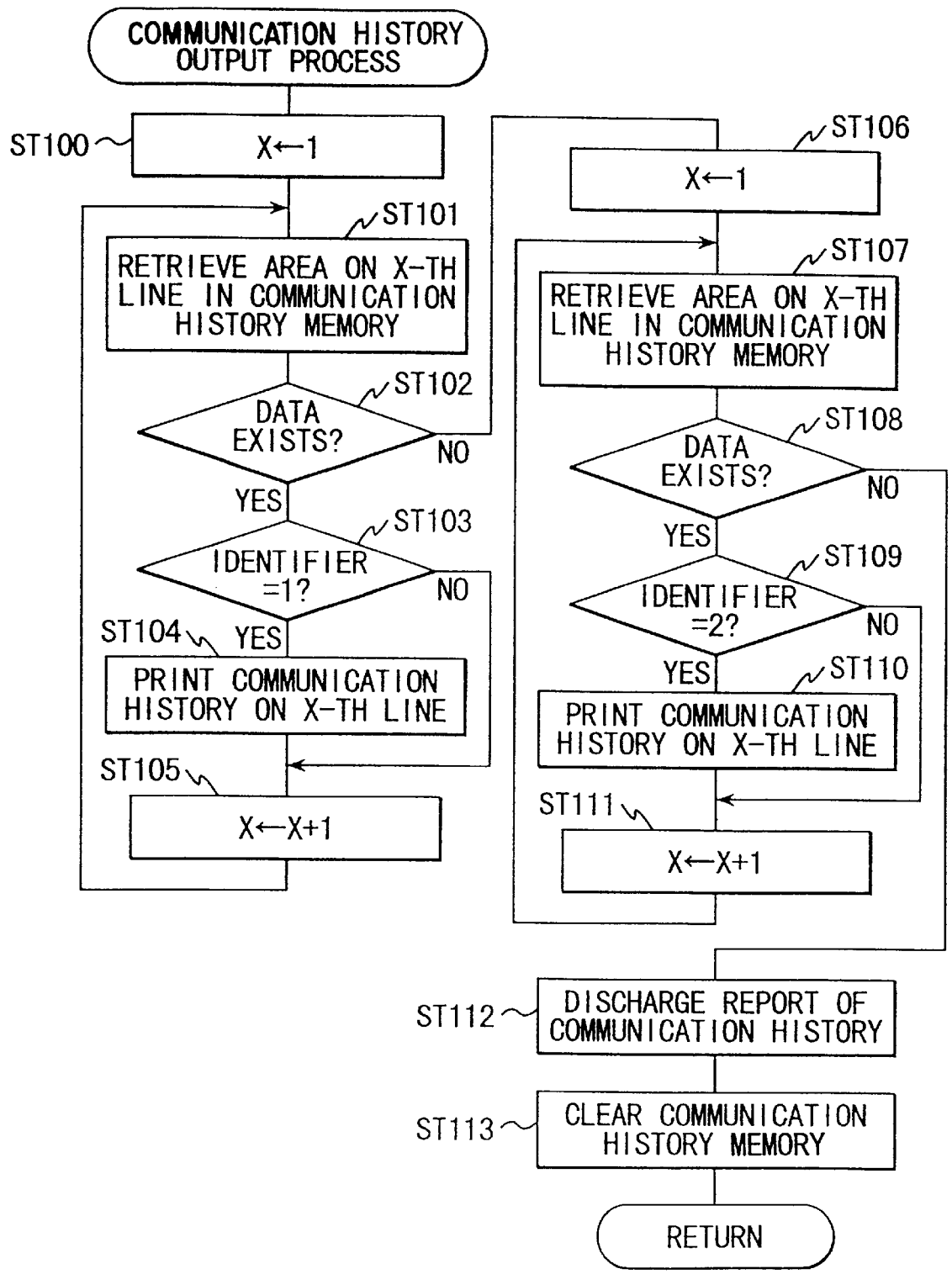
FIG. 19 is a flow chart showing a communication history output process which is performed by the facsimile control unit of the facsimile apparatus.

The facsimile apparatus 1 according to the present invention is, under control of the facsimile control unit 10, structured to perform a communication history output process shown in a flow chart shown in FIG. 19 when a communication history output mode has been instructed by the operation of the key of the keyboard 13 during no communication of image data.

That is, when the facsimile control unit 10 has started performing the communication history output process, the facsimile control unit 10 initializes a reading pointer X for the communication history memory 41 to "1". In step ST101 an area (an area of the X-th line from the top) of the communication history memory 41 indicated by the reading pointer X is retrieved in step ST101. If communication history data (identifier, date, time, ID of the station, page A, page B, period, status A, status B, status C and job number) is stored in the foregoing area, the identifier of communication history data is determined in step ST103. If the identifier=1, communication history data is history data of facsimile transmission. Therefore, the communication history is supplied to the printing portion 12 in step ST104 so that it is printed on the recording paper. If the identifier=2, the communication history data is history data of facsimile receipt. Therefore, the printing process in step ST104 is not performed. Then, the reading pointer X is updated by "+1" in step ST105, and then the operation returns to step ST101.

By repeating the processes in steps ST101 to ST105, history data of the facsimile transmission among communication history data stored in the communication history memory 41 is sequentially extracted so as to be printed on the recording paper by the printing portion 12.

If data on the X-th line in the communication history memory 41 has not been detected in step ST102, the reading pointer X is returned to "1". In step ST107 the area in the communication history memory 41 indicated by the reading pointer X is again retrieved. If communication history data is stored in the indicated area in step ST108, the identifier of communication history data above is determined in step ST109. Only when identifier=2, communication history data is supplied to the printing portion 12 so as to be printed on the recording paper in step ST110. Then, the reading pointer X is updated by "+1" in step ST111, and then the operation returns to step ST107.

By repeating the processes in steps ST107 to ST111, image data of the facsimile receipt among communication history data stored in the communication history memory 41 is sequentially extracted so as to be printed on the recording paper by the printing portion 12.

If data on the X-th line in the communication history memory 41 cannot be detected in step ST108, a cut command is transmitted in step ST112 to cut the recording paper so that a communication history report 80 having a format, for example, as shown in FIG. 20, is output. Then, the communication history memory 41 is cleared in step ST113. Thus, the foregoing process is completed.

Figure 21:
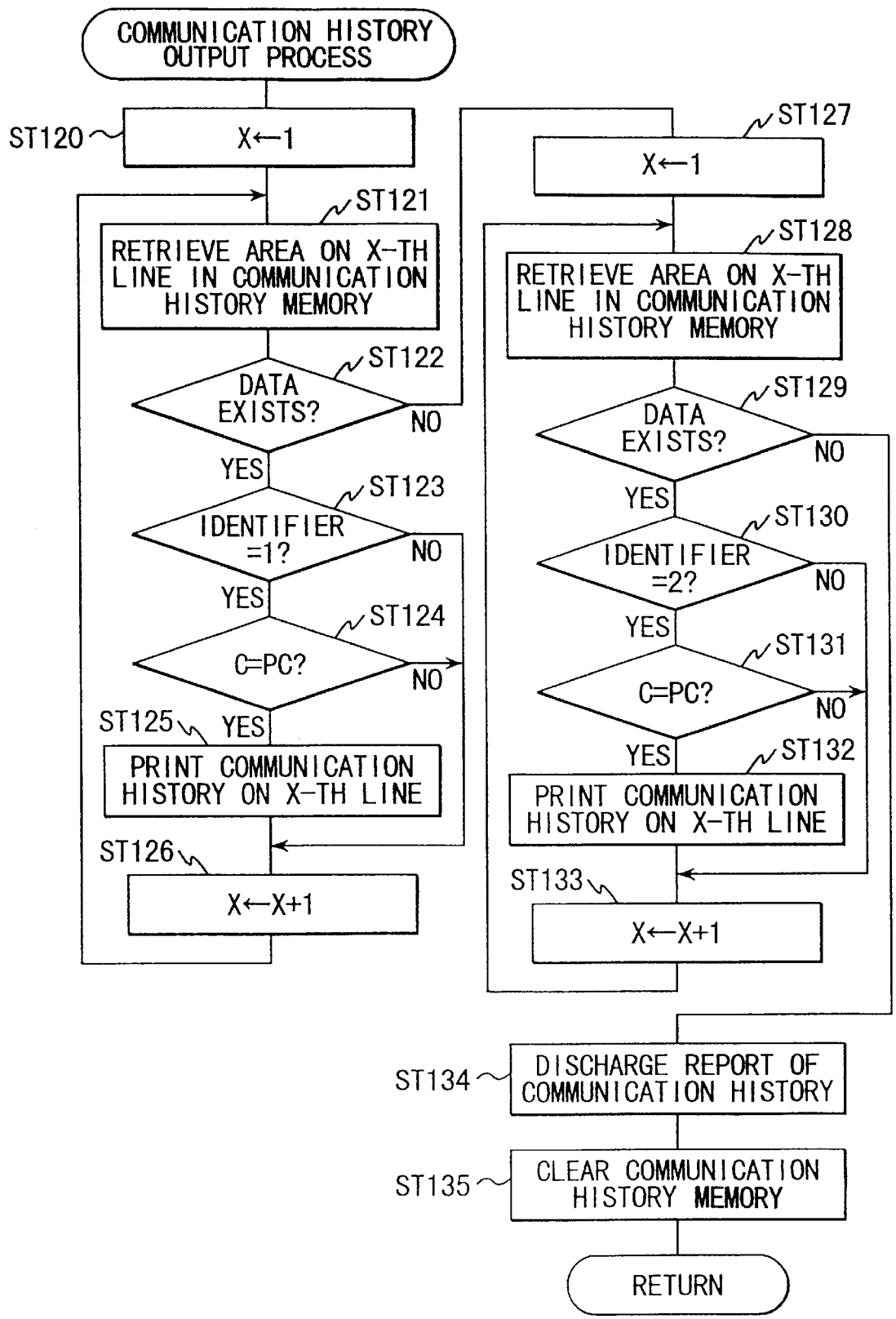
FIG. 21 is a flow chart of the communication history output process according to another embodiment of the present invention.

Although single image transmission history data d1 and personal-computer image transmission history data d2 are, in the processing order, printed on the communication history report 80, a structure may be employed in which only results of facsimile communication to which the personal computer 3 has been related are selectively printed. A flow chart of a communication history output process, which is performed by the facsimile control unit 10 in the foregoing case, is shown in FIG. 21.

When the facsimile control unit 10 has started performing the communication history output process, the reading pointer X for the communication history memory 41 is initialized to "1". Then, in step ST121, the area (area on the X-line) in the communication history memory 41 indicated by the reading pointer X is retrieved. If communication history data (identifier, date, time, ID of the station, page A, page B, period, status A, status B, status C and job number) is, in step ST122, stored in the indicated area, the identifier of communication history data above is determined in step ST123. If identifier=1, communication history data is history data of the facsimile transmission. Therefore, status C in communication history data is examined in step ST124. If information "PC" is stored as status C, communication history data is a record of facsimile transmission of image data relating to the personal computer 3, that is, image data processed by the personal computer 3. Therefore, communication history data above is supplied to the printing portion 12 so as to be printed on recording paper. If identifier=2 in step ST123 or if information "PC" is not stored as status C, the foregoing printing process is not performed. Then, the reading pointer X is increased by "+1" in step ST126, and then the operation returns to step ST121.

By repeating the processes in steps ST121 to ST126, history data of facsimile transmission among communication history data stored in the communication history memory 41 which relates to the personal computer 3 is sequentially extracted so as to be printed on the recording paper by the printing portion 12.

If data on the X-th line in the communication history memory 41 cannot be detected in step ST122, the reading pointer X is returned to "1". Then, the area instructed by the reading pointer X is retrieved in the communication history memory 41 in step ST128. If communication history data is stored in the indicated area in step ST129, the identifier of communication history data above is determined in step ST130. Only when identifier=2, status C in communication history data above is examined in step ST131. If information "PC" is stored as status C, communication history data above is a record of facsimile receipt of image data relating to the personal computer 3, that is, a record of facsimile receipt of image data supplied to the personal computer 3. Therefore, image data above is supplied to the printing portion 12 so as to be printed on recording paper. If information "PC" is not stored, the foregoing printing process is not performed. Then, the reading pointer X is updated by only "+1" in step ST133, and then the operation returns to step ST128.

By repeating the processes in steps ST128 to ST133, history data among communication history data stored in the communication history memory 41 which relates to the personal computer 3 is sequentially extracted so as to be printed on the recording paper by the printing portion 12.

If data on the X-th line in the communication history memory 41 cannot be detected in step ST129, the cut command is, in step ST134, transmitted to the printing portion 12 so that the recording paper is cut and a commu- nication history report is output. A communication history report 81 is shown in FIG. 22 as an example of the format of the communication history report. Then, the communication history memory 41 is cleared in step ST62. Thus, the foregoing process is completed.

If the structure is formed such that communication history data having status C in which information "PC" is not stored is printed in steps ST124 and ST131 shown in FIG. 21 in the communication history output process, a communication history report having history data of a record of facsimile communication to which the personal computer 3 does not relate can be obtained.

An arrangement in which all of communication history data items having no information "PC" in the status C thereof are extracted and printed, and in which all of communication history data items having information "PC" stored therein are then extracted and printed may be employed. In this case, a communication history report 82 as shown in FIG. 23 can be obtained in which the history of facsimile communication to which the personal computer 3 does not relates and the history of facsimile communication to which the personal computer 3 relate are distinguished from each other.

The personal computer transmission process shown in FIG. 11 of the foregoing embodiment has the structure such that the image transmission process shown in FIG. 14 is inhibited as an error if receipt of image data from the personal computer 3 is interrupted or if the image memory 45 is fully filled. However, an operation, in which the transmission history storage process (c) or (d) is performed, and then transmission job management data generated from previous information is stored in the transmission job management memory 42, enables image data until the error takes place to be facsimile-transmitted to the receiving station. That is, the transmission history storage process (c) or (d) is required to be performed followed by proceeding the operation to a position in front of step ST35.

As described above, the facsimile apparatus 1 according to the present invention has the structure such that setting of an original document in the original-document reading portion 11 and input of the telephone number of the receiving side of the facsimile transmission cause the single transmission process to be performed as shown in FIG. 13. That is, the original document is read by the original-document reading portion 11 and image data of the original document is sequentially stored in the image memory 45. When the original document has been read, transmission job management data, consisting of peculiar job number, telephone number (the ID of the receiving station) of the receiving side of the facsimile transmission, the number of pages of the original document to be transmitted and the header address of the image memory 45 which has stored image data of the original document, is stored in the transmission job management memory 42 in step ST55.

When transmission job management data has been stored in the transmission job management memory 42, the facsimile apparatus 1 performs the image transmission process, as shown in FIG. 14. That is, a communication line is connected to the receiving station. When the facsimile transmission is permitted, image data is sequentially read starting from the header address in transmission job management data in the image memory 45 so as to sequentially facsimile transmit image data to the receiving station. When facsimile transmission of image data for the pages of the original document in transmission job management data has been completed normally, identifier (=1) indicating transmission, date and time at which transmission has been started, the ID of the receiving station, the number of pages (page B) of image data which has been facsimile-transmitted, period taken to perform the facsimile transmission, information "OK" (status B) indicating normal end of the facsimile transmission and single transmission history data having the same job number as that of transmission job management data are stored in the communication history memory 41 in steps ST64 and ST68. If the facsimile transmission is ended abnormally attributable to a problem in the facsimile transmission, identifier (=1) indicating transmission, date and time at which the telephone number has been started, the ID of the receiving station, the number of pages (page B) of image data which has been facsimile-transmitted, time taken to complete the facsimile transmission, information "NG" indicating abnormal end of the facsimile transmission, corresponding error code "ERRnn" (status B) and single transmission history data having the same job number as that of transmission job management data are stored in the communication history memory 41 in step ST69.

When a text or the like is processed by the personal computer 3 and a requirement command for facsimile transmission of image data, such as a text, is issued to the facsimile apparatus 1, the facsimile apparatus 1 performs the personal computer transmission process as shown in FIG. 11. That is, if image data in the personal computer 3 can be received, a response indicating that receipt is permitted is transmitted to the personal computer 3. When information (including the telephone number of the receiving station and the rank of the modem) of the receiving station has been correspondently received from the personal computer 3, information of the receiving station is, together with the peculiar job number, stored in the receiving station information memory 44. If a reply requirement command is added to information of the receiving station supplied from the personal computer 3, the reply requirement flag f is set to "1" and the same is reset to "0" if the command is not added as performed in steps ST28 and ST29.

If image data is received from the personal computer 3, received image data is sequentially stored in the image memory 45. When image data has been received, transmission job management data consisting of peculiar job number, the telephone number (the ID of the receiving station) of the receiving side of the facsimile transmission, the number of pages of image data to be transmitted, the header address of the image memory 45 which stores image data to be transmitted, information "PC" (status D) indicating that the supply source of image data is the personal computer 3, and information OP for identifying whether a result of the transmission is required to be transferred to the personal computer 3 (OP:1) or to be output to the printer 33 (OP:0), are stored in the transmission job management memory 42. At this time, identifier (=1) indicating transmission, the number of pages (page A) of image data received from the personal computer 3, information "OK" (status A) indicating that communication of image data with the personal computer 3 has been ended normally, information "PC" (status C) indicating that the supply source of image data is the personal computer 3 and personal computer image transmission history data consisting of the job number which is the same as that of transmission job management data are stored in the communication history memory 41 in step ST34 (see FIG. 12A).

If the personal computer transmission process shown in FIG. 11 has been performed such that the response indicating that receipt is permitted has been transmitted to the personal computer 3 in step ST24 and information of a receiving station cannot be received from the personal computer 3 within a predetermined time, identifier (=1) indicating transmission, present date and time, information "NG" indicating that the communication of image data with the personal computer 3 has been ended abnormally, corresponding error code "ERR01" (status A), information "PC" (status C) indicating that the supply source of image data is the personal computer 3 and personal computer image transmission history document consisting of peculiar job number are stored in the communication history memory 41.

If transmission of image data from the personal computer 3 has been started and the end command is not received such that supply of image data from the personal computer 3 has been interrupted for a predetermined time, identifier (=1) indicating transmission, present date and time, the number of pages of image data which has been transmitted, the ID of the receiving station, information "NG" indicating that communication of image data with the personal computer 3 has been ended abnormally, corresponding error code "ERR02" (status A), information "PC" (status C) indicating that the supply source of image data is the personal computer 3 and personal computer image transmission history data consisting of peculiar job number are stored in the communication history memory 41 in step ST38 (see FIG. 12C).

If image data cannot be received because the image memory 45 is fully filled, image data (=1) indicating transmission, present date and time, the number of pages of image data, which has been transmitted, the ID of the receiving station, information "NG" indicating that communication of image data with the personal computer 3 has been ended abnormally, corresponding error code "ERR03" (status A), information "PC" (status C) indicating that the supply source of image data is the personal computer 3 and personal computer image transmission history data consisting of peculiar job number are stored in the communication history memory 41 in step ST39 (see FIG. 12D).

When transmission job management data has been stored in the transmission job management memory 42 as described above, the facsimile apparatus 1 performs the image transmission process. That is, the communication line is connected to the receiving station in accordance with information of the receiving station corresponding to the job number stored in the receiving station information memory 44. When the facsimile transmission has been permitted, image data is sequentially read starting from the header address in transmission job management data in the image memory 45 so as to be sequentially facsimile-transmitted to the receiving station. When facsimile transmission of image data for the number of pages to be transmitted has been completed normally, date and time at which the transmission has been started, the ID of the receiving station, the number of pages (page B) of image data which has been facsimile-transmitted, time required to complete the facsimile transmission and information "OK" (status B) indicating that the facsimile transmission has been ended normally are added to personal computer image transmission history data having the same job number as the job number of transmission job management data in the communication history memory 41. If the facsimile transmission has been ended abnormally due to, for example, a problem during the communication, date and time at which the transmission has been started, ID of the receiving station, the number of pages (page B) of image data which has been facsimile-transmitted, time taken to complete the facsimile transmission, information "NG" indicating that the facsimile transmission has been ended abnormally and corresponding error code "ERRnn" (status B) are added to personal computer image transmission history data in the communication history memory 41.

As described above, single image transmission history data indicating a result of the communication of image data of the original document received by the facsimile apparatus 1 and personal computer image transmission history data indicating a result of communication of image data received from the personal computer 3 are, in the processing order, stored in the communication history memory 41.

Thus, when the communication history output mode is instructed by operating the key of the keyboard 13, the contents of the communication history memory 41 is printed on recording paper in step ST73 so as to be output as the communication history report 80.

As shown in FIG. 20, the communication history report 80 has single image transmission history data d1 and personal computer image transmission history data d2 stored in the communication history memory 41 which are printed in the processing order. Since information "PC" indicating that the supply source of image data is the personal computer 3 is added to personal computer image transmission history data d2, single image transmission history data d1 and personal computer image transmission history data d2 can easily be distinguished from each other.

As described above, according to this embodiment, the communication history report 80 can be issued in which the transmission record of image data read by the original-document reading portion 11 and transmission record of image data received from the personal computer 3 can easily be distinguished from each other. Since information (status A and page A) indicating a result of the communication between the personal computer 3 and the facsimile apparatus 1 is added to personal computer image transmission history data d2 as well as a result of communication (status B and page B) between facsimile apparatuses, an effective data for managing the quality of the facsimile transmission using the personal computer 3 can be obtained.

Moreover, the facsimile apparatus 1 according to the present invention has the structure to perform the image processing process shown in FIG. 14 such that image data in the image memory 45 is facsimile-transmitted. Then, if the OP flag in transmission job management data is set to "1" as in step ST70, that is, if the process is a process for transmitting image data, the notification of the result of which has been required by the personal computer 3, communication history data having the job number, which coincides with the job number in transmission job management data is acquired from the communication history memory 41 in step ST72. Then, in accordance with communication history data, output data of the transmission record report is edited, and output data above is supplied to the personal computer 3. As a result, the communication result output means 39 in the personal computer 3 is operated so that the report 70 of the record of receipt shown in FIG. 17 is displayed on the CRT display 32.

That is, the operator of the personal computer 3 is able to detect, on the personal computer 3, a result of the communication of image data processed by the personal computer 3 simultaneously with completion of the facsimile transmission. Therefore, a complicated task for moving to the position, at which the facsimile apparatus 1 is disposed, to output the transmission record report by operating the facsimile apparatus 1 can efficiently be omitted.

The communication result output means 39 may cause a transmission record screen 62 to automatically be interruption-displayed on the CRT display 32 when the communication result output means 39 has received output data of the transmission record report. Another arrangement may be employed in which output data above is temporarily stored in the HDD 35 or the like; existence of output data is notified on the CRT display 32; and the transmission record screen 62 is displayed on the CRT display 32 when a calling key on the keyboard 31 has been operated.

When the OP flag in transmission job management data has been set to "0" as in step ST70, print data of the transmission record report may be edited regardless of whether or not the transmission record output mode has been selected to supply print data above to the printing portion 12 so as to automatically print the transmission record report 61 shown in FIG. 16. In this case, even if the automatic transmission record output mode of the transmission record report has been suspended, the transmission record report 61 is forcibly output. Therefore, also the facsimile apparatus 1 is able to easily confirm a result of the facsimile communication of image data processed by the personal computer 3.

A communication result (PC-FAX) between the personal computer 3 and the facsimile apparatus 1 is recorded on each of the transmission record report 61 shown in FIG. 16 and the transmission record screen 62 shown in FIG. 17 as well as the communication result (FAX—FAX) between facsimile apparatuses. Moreover, the number of pages of image data communicated between the personal computer 3 and the facsimile apparatus 1 is recorded as well as the number of pages of image data which has been facsimile-transmitted. Therefore, if a problem arises in the communication, the portion in which the problem has arisen and pages of image data which cannot correctly be facsimile-transmitted to the receiving station can be detected. As described above, management can precisely be performed.

The present invention is not limited to the above-mentioned embodiment. Although the above-mentioned embodiment has the structure in which the transmission record report is displayed on the CRT display 32 by the communication result output means 39, the transmission record report may be printed on recording paper by the printer 33.

Although the facsimile apparatus 1 returns the result of the communication to the personal computer 3 only when the requirement command for the result of the communication has been issued from the personal computer 3, another structure may be employed in which the result of the communication is, regardless of existence of the command, always returned to the personal computer 3 when image data processed by the personal computer 3 is facsimile-transmitted. Moreover, the transmission record report 61 is printed. Alternatively, only the result of the communication may be transferred to personal computer 3, or only the transmission record report 61 may be printed.

When the facsimile apparatus 1 according to the present invention has received image data from the facsimile apparatus 1a, which is the sending station connected through the public telephone network 4 by the predetermined facsimile transmission control procedure, the image receiving process is performed as shown in FIG. 10. If the personal computer receiving mode is not selected in step ST3, received image data is printed on recording paper by the printing portion 12. When the process for printing received image data has been completed normally, identifier (=2) indicating receipt, date and time at which the receipt has been started, the ID of the sending station, the number of pages (page B) of facsimile-received image data, time taken to complete the facsimile receipt and printing, information "OK" (status B) indicating normal end of the facsimile receipt and single receipt history data including peculiar job number are stored in the communication history memory 41. If the facsimile receipt is ended abnormally due to a problem of the communication during the facsimile receipt, identifier (=2) indicating receipt, date and time at which the receipt has been started, the ID of the sending station, the number of pages (page B) which has been facsimile-received, time taken to complete the facsimile receipt and printing, information "NG" indicating abnormal end of the facsimile receipt, corresponding error code "ERRnn" (status B) and single receipt history data consisting of peculiar Job number are stored in the communication history memory 41.

If the personal computer receipt mode has been selected, received image data is sequentially stored in the image memory 45 as in step ST5. When image data has been received, peculiar job number, the number of pages of image data, which has been facsimile-received and receipt job management data consisting of the header address of the image memory 45 which has stored received image data are stored in the receipt job management memory 43. At this time, as in steps ST2, ST5 and ST11, identifier (=2) indicating receipt, date and time at which the receipt has been started, the ID of the sending station, the number of pages (page B) of image data which has been facsimile-received, time taken to complete the facsimile receipt, information "OK" (status B) indicating normal end of the facsimile receipt, information "PC" (status C) indicating that the receiving side of image data is the personal computer 3 and personal computer receipt history data consisting of the same job number as that of receipt job management data are stored in the communication history memory 41. If the facsimile receipt is ended abnormally due to a problem of the communication, identifier (=2) indicating receipt, date and time at which the receipt has been started, the ID of the sending station, the number of pages (page B) of image data which has been facsimile-received, time taken to complete the facsimile receipt, information "NG" indicating abnormal end of the facsimile receipt, corresponding error code "ERRnn" (status B), information "PC" (status C) indicating that the receiving side of image data is the personal computer 3 and personal computer receipt history data consisting of peculiar job number are stored in the communication history memory 41, as in steps ST2, ST5 and ST12.

When receipt job management data has been stored in the receipt job management memory 43, the image output process is performed in the facsimile apparatus 1 as shown in FIG. 15. That is, transference of image data is notified to the personal computer 3. When a permission response has been received from the personal computer 3 as in step ST82, image data is sequentially read starting from the header address in the receipt job management data in the image memory 45 to sequentially transmit image data to the personal computer 3 through the communication interface 19 and the communication interface cable 2. When image data for the number of pages of received image data has been normally transmitted, the end command is transmitted to the personal computer 3 as in step ST87. When normal receipt response has been received from the personal computer 3, the number of pages (page A) and information "OK" (status A) indicating normal end of the communication with the personal computer 3 are, as in step ST89, added to personal computer receipt history data having the same job number as that of receipt job management data in the communication history memory 41.

If a transmission requirement has been made to the personal computer 3 as in step ST90 and a permission response cannot be received from the personal computer 3 within a predetermined time and the permission response cannot be received even after a plurality of retrial operations, image data cannot be transmitted. Therefore, image data to be transmitted to the personal computer 3 is, as in step ST93, read from the image memory 45 and printed on recording paper by the printing portion 12. At this time, information "NG" indicating abnormal end of the communication with the personal computer 3 and its error code "ERR10" (status A) are added to personal computer receipt history data having the same job number as that of receipt job management data in the communication history memory 41. After image data has been printed, the report 70 of the record of receipt is printed on recording paper by the printing portion 12 in accordance with personal computer receipt history data having the job number which coincides with the job number in receipt job management data, as in step ST94.

Also in a case where a problem arises in the communication of image data to the personal computer 3 or in a case where a normal receipt response cannot be received within a predetermined time after the end command has been transmitted to the personal computer 3, image data for one communication to be transmitted to the personal computer 3 is printed on recording paper by the printing portion 12. At this time, the number of pages of image data which has been transmitted to the personal computer 3 until the problem has arisen, information "NG" indicating abnormal end of the communication with the personal computer 3 and its error code "ERR11" (status A) are added to personal computer receipt history data having the same job number as that receipt job management data in the communication history memory 41 as in step ST92. Also in this case, after image data has been printed the report 70 of the record of receipt is printed on recording paper by the printing portion 12 in accordance with personal computer receipt history data having the job number which coincides with the job number in receipt job management data as in step ST94.

In a state where the personal computer receipt mode has been selected as described above, data (status B and page B) indicating a result of the communication of image data, which has been facsimile-received, between the facsimile apparatuses and data (status A and page A) indicating a result of the communication between the facsimile apparatus 1 and the personal computer 3 are, in the processing order, stored in the communication history memory 41. When a communication history output mode is instructed by operating the key of the keyboard 13, the contents of the communication history memory 41 are printed on recording paper by the printing portion 12 so as to be output as the communication history report 80.

As shown in FIG. 20, transmission/receipt history data including personal computer receipt history data are, in the processing order, printed on the communication history report 80. Since personal computer receipt history data above includes data (status A and page A) indicating the result of the communication between the facsimile apparatus 1 and the personal computer 3 as well as data (status B and page B) indicating the result of the communication between the facsimile apparatuses, the result of the communication with the personal computer 3 can easily be recognized as well as the result of the communication between the facsimile apparatuses. For example, result d3 indicates that image data of 13 pages has been communication between facsimile apparatuses (F—F), image data of one page has been communication between the personal computer and the facsimile apparatus (P-F) and an error takes place (ERR10).

As described above, according to this embodiment, the communication history report 80 can be issued with which a result of communication between facsimile apparatuses and a result of communication with the personal computer 3 can be recognized. An example case can be considered in which deterioration in the communication interface cable 2 for establishing the connection between the facsimile apparatus 1 and the personal computer 3 results in the quality of communication being allowed to deteriorate and thus the error rate is raised. In this case, the problem can easily be detected by looking the communication history report 80 according to this embodiment so that the cause of the problem is quickly found.

Since the result of communication between the facsimile apparatuses includes the number of pages of facsimile-received image data and the result of the communication with the personal computer 3 includes the number of pages of image data which has been transmitted to the personal computer 3, the page at which lacking of image data to be transmitted to the personal computer 3 starts can easily be detected. Therefore, a countermeasure against lacking can easily be taken.

If a communication error occurs when image data is transmitted to the personal computer 3 as shown in FIG. 15, image data for one communication to be transmitted is, as in step ST93, printed on recording paper by the printing portion 12. Moreover, the report 70 of the record of receipt on which information indicating a result of communication of image data above between the facsimile apparatuses and information indicating a result of communication between the facsimile apparatus 1 and the personal computer 3 are printed is automatically printed on the recording paper following the operation of printing image data. Therefore, by confirming the report 70 of the record of receipt as shown in FIG. 18, a fact can be recognized that the image printed by the printing portion 12 is not an image printed in the single receipt mode but the same is an image printed in place of a fact that transmission to the personal computer 3 cannot be performed. Since the report 70 of the record of receipt is automatically printed, occurrence of a problem in the communication with the personal computer 3 can quickly be detected with the key operation for obtaining the communication history report 80.

Although the foregoing embodiment has the structure such that the facsimile-received image is transferred to the personal computer 3, image may be transferred to a monitor unit which simply displays a received image. Moreover, the image processing apparatus may be a word processor. Moreover, as a matter of course, a variety of modifications may be permitted within the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A facsimile apparatus for performing data communication with another facsimile apparatus through a communication line and data communication with an image processing apparatus through a communication cable, said facsimile apparatus comprising:

reading means for reading an image of an original document and supplying image data of the original document;

a modem for performing the data communication with said another facsimile apparatus;

a communication interface for performing the data communication with said image processing apparatus;

an image memory for storing image data;

first transfer means for performing data transference from said reading means to said image memory;

second transfer means for performing data transference between said modem and said image memory;

third transfer means for performing data transference between said communication interface and said image memory;

determining means for, when a transference error has occurred, determining whether or not the transference error has occurred in said second transfer means and whether or not the transference error has occurred in said third transfer means;

communication history storage means for distinguishably storing communication results relating to said second and third transfer means, including determination results of said determining means; and communication history supply means for supplying the communication results stored in said communication history storage means.

2. A facsimile apparatus according to claim 1, wherein said communication history supply means includes means for determining whether or not supply of the communication results has been required by said image processing apparatus.

3. A facsimile apparatus for performing data communication with another facsimile apparatus and an image processing apparatus, said facsimile apparatus comprising:

first communication means for performing data communication with said another facsimile apparatus;

second communication means for performing data communication with the image processing apparatus;

an image memory for storing image data of an original document;

means for storing identification information which indicates whether the stored image data of the original document only relates to communication by said first communication means, or whether the stored image data of the original document relates to communication by both of said first and second communication means; and reading means for optically reading the original document and supplying image data of the original document;

wherein said identification information storage means stores first identification information for recognizing image data which is stored in said image memory by said reading means and is to be transmitted to said another facsimile by said first communications means, and second identification information for recognizing image data which is stored from said image processing apparatus in said image memory by said second communication means and is to be transmitted to said another facsimile apparatus by said first communication means.

4. A facsimile apparatus for performing data communication with another facsimile apparatus and an image processing apparatus, comprising:

at least one of transmitting means which receives image data of a first original document from the image processing apparatus and transfers the image data of the first original document to said another facsimile apparatus, and receiving means which receives image data of a second original document from said another facsimile apparatus and transfers the image data of the second original document to the image processing apparatus; and means for storing both first and second data communication histories which indicate data communication results of said image data of one of the first and second original documents, said first data communication being performed between the facsimile apparatus and said image processing apparatus, said second data communication being performed between the facsimile apparatus and said another facsimile apparatus.

* * * * *